(12) United States Patent
Yasuie et al.

(10) Patent No.: US 7,385,930 B2
(45) Date of Patent: Jun. 10, 2008

(54) PACKET DISCARD POINT PROBING METHOD AND DEVICE

(75) Inventors: Takeshi Yasuie, Kawasaki (JP); Yuji Nomura, Kawasaki (JP); Satoshi Nojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 10/974,523

(22) Filed: Oct. 27, 2004

(65) Prior Publication Data
US 2005/0286432 A1 Dec. 29, 2005

(30) Foreign Application Priority Data
Jun. 24, 2004 (JP) ............................. 2004-186900

(51) Int. Cl.
*H04L 12/26* (2006.01)
(52) U.S. Cl. ..................... 370/244; 370/246; 370/394
(58) Field of Classification Search ................ 370/242, 370/243, 244, 245, 246, 394
See application file for complete search history.

(56) References Cited

U.S. PATENT DOCUMENTS 5,991,307 A * 11/1999 Komuro et al. ............. 370/473
6,061,352 A * 5/2000 Yamazaki et al. ........... 370/394
6,744,764 B1 * 6/2004 Bigdeliazari et al. ........ 370/394
6,862,283 B2 * 3/2005 Marietta et al. ............. 370/394

FOREIGN PATENT DOCUMENTS

JP 2000-332810 11/2000
JP 2003-318985 11/2003

* cited by examiner

*Primary Examiner*—Min Jung
(74) *Attorney, Agent, or Firm*—Katten Muchin Rosenman LLP

(57) ABSTRACT

In a relay device or the like in which a speed changes from a high speed to a low speed, a packet residence (packet transfer wait) occurs when a packet string in which packet intervals are shortened arrives. When a packet discard occurs before passing through the relay device or the like, a packet interval having been lengthened by the packet discard is shortened by the relay device or the like for transferring packets. When a packet discard occurs after passing through the relay device or the like, a packet interval having been lengthened by the packet discard remains unshortened for transferring packets. Therefore, by observing at terminals the packet discard and the packet interval on the occasion of the packet discard, whether the packet discard has occurred in the high speed section or the low speed section is specified.

24 Claims, 32 Drawing Sheets

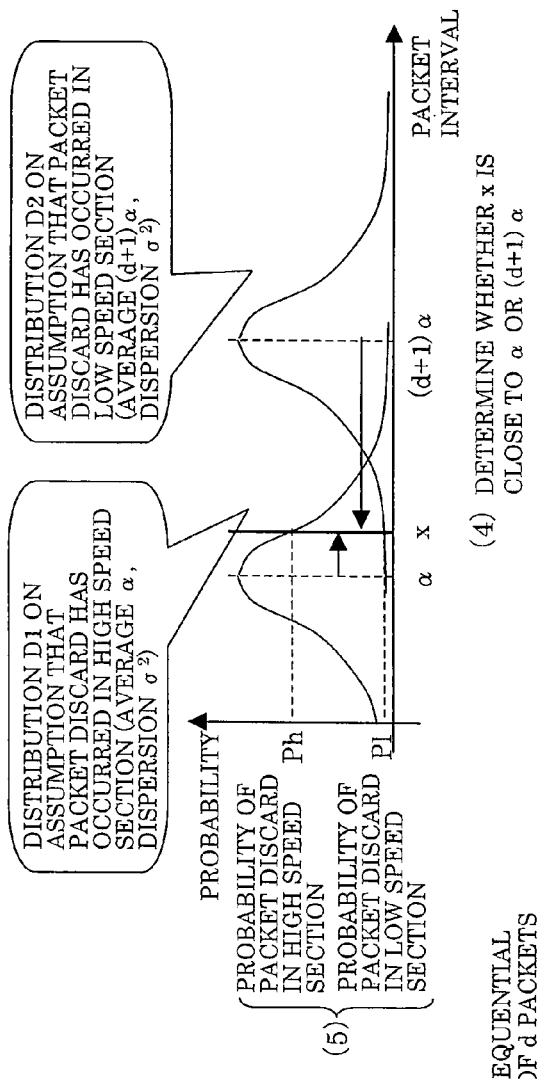
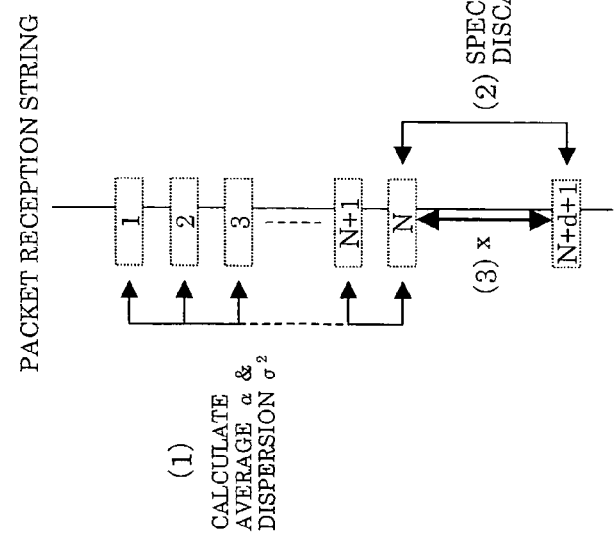

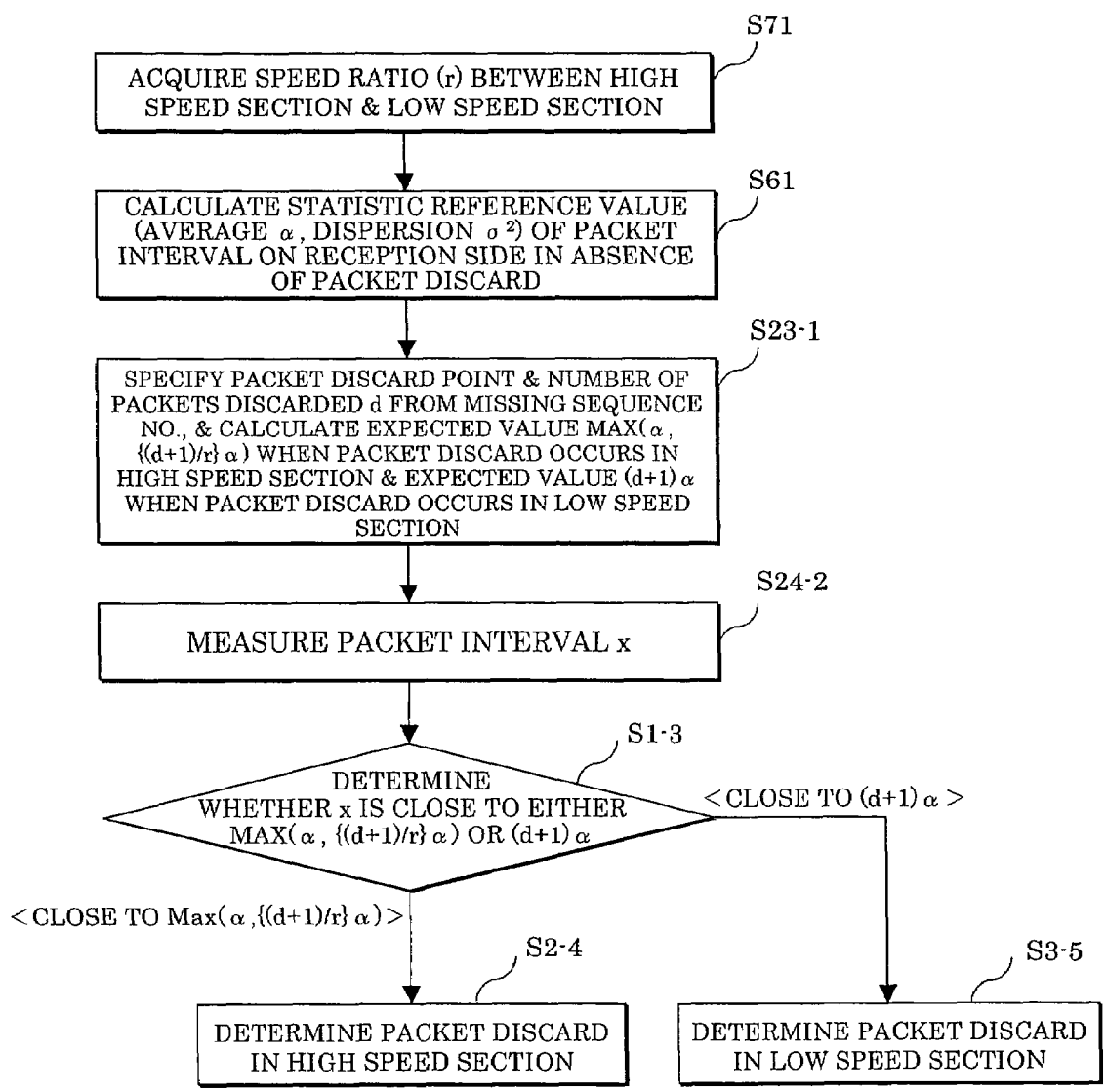

PACKET DISCARD POINT PROBING METHOD AND DEVICE

BACKGROUND OF THE INVENTION

1. Field of the Invention

The present invention relates to a packet discard point probing method and device, and in particular to a method and device for detecting a packet discard fault in a network fault probing field.

2. Description of the Related Art

Methods for specifying a packet discarded section generally include two methods of performing a discard point probing by utilizing "ping" from a remote location and of inspecting communication between two locations by packet capturing.

The former probing method is performed by designating an IP address (layer 3) of a probed object with a router being as a probing boundary to measure a discard ratio.

In the latter probing method utilizing packet capturing, packets communicated between two devices are captured and the packets transmitted/received are compared, thereby specifying the discarded point or location.

Additionally, there is a network relay device which, in order to specify a fault location upon interruption of communication between devices in a frame relay, uses an Inverse ARP supported by the frame relay for confirming the communication, wherein an Inverse ARP request is transmitted by a command, and by receiving an Inverse ARP response, the communication in the frame relay is confirmed. A transmission is requested with a parameter designated by a command upon Inverse ARP transmission, and an opposite device adds a parameter upon response frame transmission to an Inverse ARP request frame to be notified to the opposite device, whereby the transmission and return parameters can be set in detail and the fault location can be specified (see e.g. patent document 1).

Furthermore, there are a quality status monitoring method and device in a packet network which, in order to specify an occurrence of a quality reduction and its occurrence location in a packet network, monitors a network quality by comparing a transmission status and a reception status of packets to be monitored, and determines a quality reduction occurrence section when the quality reduction is found. A plurality of measuring devices are set in a network which becomes a quality measurement monitor object, a mutual correlation function is calculated to perform a quality evaluation based on a packet passing time series obtained by probing packets in the respective measuring devices, logical topology assuming a tree structure is prepared from packet transfer path information when the occurrence of the quality reduction is determined, and the occurrence location of the quality reduction is determined by using the logical topology (see e.g. patent document 2).

[Patent document 1]

Japanese Patent Application Laid-open No. 2000-332810

[Patent document 2]

Japanese Patent Application Laid-open No. 2003-318985

Since the above-mentioned probing method using ping performs designating the IP address (layer 3) of the probed object, it is impossible to specify a discard point before and after an L2-SW (layer 2 switch), a hub, a LAN-TA (LAN terminal adapter), or the like which is a relay device operative in the layer 2. Therefore, a pair of suspected routers, and all of the relay devices forming trunk lines have to be replaced in the worst case in order to recover from a fault which causes a packet discard. As a result, there has been a problem that much time and cost are required until the fault recovers.

Also, there has been a problem that labor cost and temporal cost for setting, operating, and measuring two devices are expensive in the packet capture probing method. Moreover, there has been a problem that a capture device is required, and in many cases there is a restriction for setting the device (e.g. probing is disabled in a carrier line).

Furthermore, in the patent document 1, a priority class is designated, and presence/absence of a discard is only confirmed, so that the discard point can not be specified. Also, in the patent document 2, numerous hosts are required and further the discard points which can be specified are restricted by the topology.

SUMMARY OF THE INVENTION

It is accordingly an object of the present invention to provide a packet discard point probing method and device which can specify a discard point before and after an L2 switch, a hub, a LAN-TA (LAN terminal adaptor), or the like which is a relay device operative in the layer 2 without requiring numerous hosts and which can reduce time, cost, and labor until a recovery from a fault.

In order to achieve the above-mentioned object, a packet discard point probing method according to the present invention comprises: a first step of transmitting packets having sequentiality to a transmission line in which a speed changes from a high speed section to a low speed section; a second step of receiving the packets; a third step of detecting a packet discard based on the sequentiality of the packets received; and a fourth step of determining whether or not a packet interval is shortened due to the packet discard and, based on the determination, of determining whether or not the packet discard has occurred at least in the high speed section.

Namely, in the present invention, as shown in FIG. 1, when packets are sequentially transmitted to a transmission line between two terminals T1 and T2 having sections in which the speeds are different from each other, a speed change occurs due to a relay device SW or the like positioned between a high speed section (line) (a) and a low speed section (b).

When a discard of a packet 2 among sequential packets 1, 2, 3, . . . occurs in the high speed section (a)(example (A) in FIG. 1), and when the packets are transferred from the relay device SW due to a packet residence effect (buffer) in the relay device SW, the interval between the packets 1 and 3 having arrived assumes a value a which indicates a more shortened interval than an original interval (β).

On the other hand, when no packet discard occurs in the high speed section (a) and the discard of the packet 2 among the packets 1, 2, 3, occurs upon the packet transfer from the relay device SW to the low speed section (b)(example (B) in FIG. 1), the packets arrive unchanged. Therefore, the interval between the packets 1 and 3 assumes the original value β.

Accordingly, as shown in FIG. 2, the packet discard is detected (at step S0), and then whether or not the interval between the packets having arrived is more shortened than the original interval is determined (at step S1). If the interval is shortened, it is determined that the packet discard has occurred in the high speed section (at step S2). If it is unshortened, it is determined that the packet discard has occurred in a section other than the high speed section (at step S3).

The above-mentioned first step may be executed at a terminal different from a terminal at which the second to the fourth steps are executed, and the third and the fourth steps may be executed to determine that a packet discard has occurred in the high speed section when the packet interval is shortened and that a packet discard has occurred in the low speed section when the packet interval is unshortened.

Namely, in the present invention, the packets are sequentially transmitted from a transmitting terminal to another receiving terminal, so that the sequentiality and the arrival interval of the packets received at the receiving terminal are observed, whereby whether the packet discard has occurred in the high speed section or the low speed section can be specified.

Also, the above-mentioned first to the fourth steps may be executed at a same probing terminal, a probing packet may be transmitted from the probing terminal, and the third and the forth steps may be executed to a response packet received from an opposing probed terminal, thereby specifying whether or not a packet discard has occurred in a high speed section in an up direction based on a sequence number and an arrival interval of the response packet.

Namely, in the present invention, a probing packet (ping request packet) is sequentially transmitted from the probing terminal to a probed terminal, so that the sequence number and the arrival interval of a response packet (ping response packet) returned from the probed terminal are observed, whereby the packet discard is detected and it can be specified that the packet discard has occurred in a high speed section in an up direction when the packet interval is shortened.

Furthermore, the above-mentioned probing packet may include contents for setting an IP time stamp indicating the packet interval at the probed terminal, and the third step may observe the sequence number of the response packet and IP time stamp information set by the probed terminal, thereby detecting the packet discard.

Namely, in the present invention, the probing packet (ping request packet) including contents for setting an IP time stamp at the probed terminal are sequentially transmitted from the probing terminal to the probed terminal, so that the sequence number of the response packet (ping response packet) and IP time stamp information set by the probed terminal are observed by the probing terminal, whereby it can be specified whether or not the packet discard has occurred in the high speed section in the up direction.

It is to be noted that the time stamp is usually installed on the terminal as a control command of an IP, and since the time when the probed terminal has received the packet is set in the packet, the packet discard section can be specified by using the time stamp even when a large fluctuation occurs in the packet interval in the down section.

Also, the above-mentioned probing packet may have a size large enough to cause an IP fragment to a probed terminal, and the third and the fourth steps may be executed to observe a sequence number and an arrival interval of a fragment response packet, thereby determining an occurrence of a packet discard in a high speed section or a low speed section in a down direction.

Namely, a probing packet (fragment ping request packet) having a size large enough to cause an IP fragment is transmitted from the probing terminal to a probed terminal, so that the sequence number and the arrival interval of its response packet (fragment ping response packet) are observed by the probing terminal, thereby enabling whether or not the packet discard has occurred in the high speed section of the transmission line in the down direction to be specified. This takes advantage that the fragment ping request packet is once assembled at the probed terminal and this assembled packet is again fragmentated to be returned as a fragment response packet.

Furthermore, the above-mentioned first and the second steps may be executed by using a packet for TCP data communication between different terminals, and a data receiving terminal may observe a sequence number and an arrival interval of a data receiving packet at the third and the fourth steps, thereby specifying whether a packet discard has occurred in a high speed section or a low speed section in an up TCP data transfer direction.

Here, the probing packet is not used as mentioned above, but a packet for TCP data communication such as file transfer actually communicated between terminals is used, so that the TCP sequence number and the arrival interval of a data receiving packet are observed by a data receiving terminal, thereby enabling whether the packet discard has occurred in the high speed section or the low speed section of the transmission line in the up direction (TCP data transfer direction) to be specified.

Furthermore, the above-mentioned first and the second steps may be executed at a same terminal to transmit a packet for TCP data communication from a transmitting terminal, and at the third and the fourth steps a sequence number and an arrival interval of an Ack packet returned from a data reception side may be observed by the transmitting terminal, thereby specifying whether or not a packet discard has occurred in a high speed section in an up TCP data transfer direction.

Namely, also in this case, the probing packet is not used, but a packet for TCP data communication such as file transfer actually communicated between two terminals is transmitted from a transmitting terminal, so that the sequence number and the arrival interval of an Ack packet returned from a receiving side are observed, thereby enabling whether or not the packet discard has occurred in the high speed section in an up TCP data transfer direction to be specified. Also in this case, the TCP sequence number is used as a sequence number.

Furthermore, the above-mentioned first step may limit a number of packets sequentially transmitted at one time to a number of packets which do not overflow a buffer on the transmission line.

Namely, if the number of sequential transmissions is increased in the probing of sequentially transmitting packets, a packet discard due to a packet overflow occurs in the relay device or the like on the transmission line with a speed difference from a high speed to a low speed. In this case, since the packet discard section can not be specified from the packet interval and the IP time stamp difference, it is required to perform probing without causing the packet discard due to the buffer overflow.

Therefore, the number of packets sequentially transmitted at one time from the transmitting terminal or the probing terminal is set to a small number, that is e.g. periodical and sequential communication is performed at transmission intervals, or the probing packet is sequentially transmitted, whereby the buffer overflow in the relay device or the like is prevented from occurring, which makes the packet discard hard to occur.

Furthermore, the above-mentioned first step may be executed to transmit packets at transmission intervals calculated based on a bottleneck bandwidth of the transmission line.

Namely, when a bottleneck bandwidth of the transmission line of the packet is recognized, an optimum transmission interval is calculated. The transmitting terminal or the probing terminal transmits the packets at the transmission intervals, thereby making the packet discard difficult to occur.

Also, the above-mentioned fourth step may include steps of calculating a statistic reference value of a packet interval on a reception side in an absence of a packet discard, and of determining whether a packet interval upon detecting the packet discard is close to either a packet interval-expected value for the high speed section or a packet interval-expected value for the low speed section obtained from the reference value and a number of discarded packets, thereby determining whether the packet discard has occurred in the high speed section or the low speed section of the transmission line.

Namely, a reference value (average, dispersion) that is statistic information of the packet arrival interval (including time stamp difference) on the packet receiving side in the absence of the packet discard is calculated, expected values of the packet interval in the high speed section and the low speed section are obtained from the reference value and the number of packets discarded upon detecting the packet discard, and the expected values are compared with the packet interval upon detecting the packet discard, thereby enabling whether the packet discard has occurred in the high speed section or the low speed section to be determined.

Furthermore, the above-mentioned fourth step may include a step of calculating a speed ratio between the high speed section and the low speed section, and as a packet interval-expected value in the high speed section a larger one of packet interval-expected values in a case where packet intervals by the reference value are completely shortened and in a case where a part of packet intervals incorporating the speed ratio into the reference value is shortened may be used.

Namely, when a speed ratio between the high speed section and the low speed section is already known or small, the packet intervals are not completely shortened even if the packet discard occurs in the high speed section. Therefore, a ratio in which the packet interval is shortened upon the packet discard in the high speed section is calculated from the speed ratio between the high speed section and the low speed section, thereby enabling whether the packet discard has occurred in the high speed section or low speed section to be determined in consideration of the ratio.

A probability based on statistic information of the packet intervals upon detecting the packet discard may be substituted for each of the above-mentioned expected values, and a higher one of packet discard probabilities in respective probability distributions under assumption that a packet discard has occurred in the high speed section and the low speed section may be selected, thereby determining whether the packet discard has occurred in the high speed section or the low speed section of the transmission line.

A device which realizes the above-mentioned packet discard point probing method comprises: first means of transmitting packets having sequentiality to a transmission line in which a speed changes from a high speed section to a low speed section; second means of receiving the packets; third means of detecting a packet discard based on the sequentiality of the packets received; and fourth means of determining whether or not a packet interval is shortened due to the packet discard and, based on the determination, of determining whether or not the packet discard has occurred at least in the high speed section.

The above-mentioned first means may be provided to a terminal different from a terminal of the second to the fourth means, and the third and the fourth means may determine that a packet discard has occurred in the high speed section when the packet interval is shortened and that a packet discard has occurred in the low speed section when the packet interval is unshortened.

Also, the above-mentioned first to the fourth means may be provided to a same probing. terminal, a probing packet may be transmitted from the probing terminal, and the third and the forth means may specify whether or not a packet discard has occurred in a high speed section in an up direction based on a sequence number and an arrival interval of a response packet for the response packet received from an opposing probed terminal.

Also, the above-mentioned probing packet may include contents for setting an IP time stamp indicating the packet interval at the probed terminal, and the third means may observe the sequence number of the response packet and IP time stamp information set by the probed terminal, thereby detecting the packet discard.

Also, the first to the fourth means may be provided to a same probing terminal, a probing packet may be transmitted from the probing terminal, the probing packet may have a size large enough to cause an IP fragment to a probed terminal, and the third and the fourth means may observe a sequence number and an arrival interval of a fragment response packet, thereby determining an occurrence of a packet discard in a high speed section or a low speed section in a down direction.

Furthermore, the above-mentioned first and the second means may be provided to different terminals and executed by using a packet for TCP data communication between the different terminals, and a data receiving terminal may observe a sequence number and an arrival interval of a data receiving packet at the third and the fourth means, thereby specifying whether a packet discard has occurred in a high speed section or a low speed section in an up TCP data transfer direction.

Furthermore, the above-mentioned first and the second means may be provided to a same terminal to transmit a packet for TCP data communication from a transmitting terminal, and at the third and the fourth means a sequence number and an arrival interval of an Ack packet returned from a data reception side may be observed by the transmitting terminal, thereby specifying whether or not a packet discard has occurred in a high speed section in an up TCP data transfer direction.

Also, the above-mentioned first means may limit a number of packets sequentially transmitted at one time to a number of packets which do not overflow a buffer on the transmission line.

Furthermore, the above-mentioned first means may transmit packets at transmission intervals calculated based on a bottleneck bandwidth of the transmission line.

Furthermore, the above-mentioned fourth means may include means of calculating a statistic reference value of a packet interval on a reception side in an absence of a packet discard, and of determining whether a packet interval upon detecting the packet discard is close to either a packet interval-expected value for the high speed section or a packet interval-expected value for the low speed section obtained from the reference value and a number of discarded packets, thereby determining whether the packet discard has occurred in the high speed section or the low speed section of the transmission line.

Furthermore, the above-mentioned fourth means may include means of calculating a speed ratio between the high speed section and the low speed section, and as a packet interval-expected value in the high speed section a larger one of packet interval-expected values in a case where packet intervals by the reference value are completely shortened and in a case where a part of packet intervals incorporating the speed ratio into the reference value is shortened may be used.

A probability based on statistic information of the packet intervals upon detecting the packet discard may be substituted for each of the expected values, and a higher one of packet discard probabilities in respective probability distributions under assumption that a packet discard has occurred in the high speed section and the low speed section may be selected, thereby determining whether the packet discard has occurred in the high speed section or the low speed section of the transmission line.

The effect of the present invention is summarized as follows:
(1) A packet discard section under the layer 2 can be specified from a location on one side in a short time;
(2) While in the conventional technology persons ran to both locations and performed various tests/data analyses for specifying the packet discard point by CE/SE or the like, the time, labor costs, and business trip costs can be greatly reduced in the present invention;
(3) It is not required to provide numerous hosts.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 30A-30C are diagrams for illustrating the case where a discard section is determined from a packet interval (time stamp difference) in an operational embodiment (8) of the present invention;

FIG. 33 is a flow chart of an operational embodiment (9) of the present invention.

DESCRIPTION OF THE EMBODIMENTS

Hereinafter, embodiments of the present invention will be described referring to attached figures.

Figure 3:
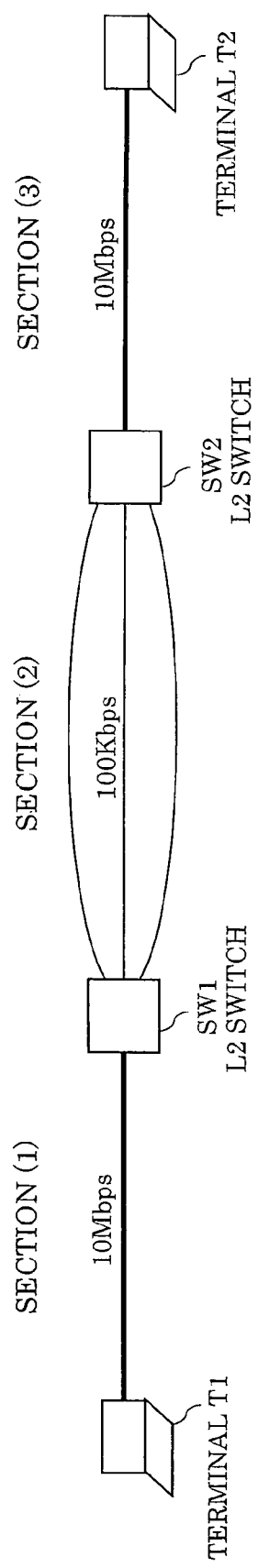
FIG. 3 is a block diagram showing a network arrangement covered by the present invention.

FIG. 3 shows an arrangement of an object network to which the embodiment of the present invention is applied. A network environment is set up where two L2 switches SW1 and SW2 are connected as relay devices between two terminals (personal computers or the like) T1 and T2, and sections (1) and (3), which are of 10 Mbps (high speed section), are connected to a section (2), which is of 100 Kbps (low speed section), so that there is a speed difference therebetween. It is to be noted that this arrangement is generally known as a LAN-WAN-LAN environment.

Figure 4:
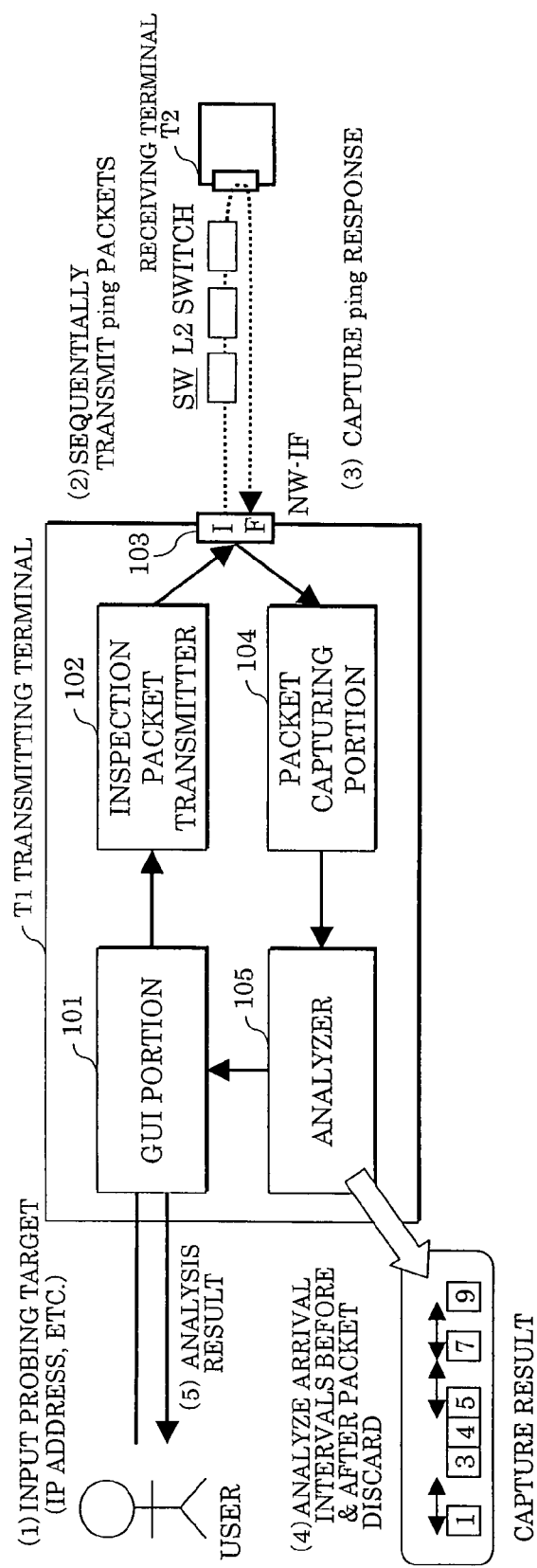
FIG. 4 is a block diagram showing an embodiment of a transmitting terminal and a receiving terminal used for the present invention.

FIG. 4 shows an embodiment of an arrangement of the above-mentioned terminal T1 or T2, in which portions 101-105 perform following processings.

GUI portion 101: Displaying a user's input, a parameter change, and an analysis result.

Inspection packet transmitter 102: Transmitting an inspection packet (ping) to a probing target.

Interface 103: Executing interface processing with the outside.

Packet capturing portion 104: Capturing packets addressed to its own terminal.

Analyzer 105: Analyzing captured data and specifying a packet discard section.

In this embodiment, a packet probing is executed by the following procedures:

(1) A user U inputs from the GUI portion 101 an IP address of a probing target required for probing.

(2) The inspection packet transmitter 102 sequentially transmits the pings to the probing target.

(3) The packet capturing portion 104 captures ping response packets.

(4) The analyzer 105 searches discarded packets from the captured result by the packet capturing portion 104, and specifies whether each of the packet discards has occurred in the high speed section or the low speed section from the arrival intervals before and after the packet discarded.

(5) The GUI portion 101 outputs the analysis result to the user U.

It is to be noted that as will be described later there is a case where all of the components function at the transmitting terminal T1 or a case where only the GUI portion 101 and the inspection packet transmitter 102 function at the transmitting terminal T1, and correspondingly only the GUI portion 101, the packet capturing portion 104, and the analyzer 105 function at the reception terminal T2.

In such a network arrangement, packets which have a large packet length (e.g. 1500 bytes) and which are sequentially transmitted (packet intervals are shortened such as 100 packets), or response packets from the opposing terminal are used for specifying the packet discard point. Since the longer the packet length is, an interval difference between the packet discard in the high speed section and the packet discard in the low speed section generally becomes large, so that it becomes easy to determine. Also, for the packet discard to be determined, methods of successively determining all of the intervals before and after the points where the packet discards have occurred, of determining the most-shortened packet interval upon the packet discard, and the like can be mentioned.

Hereinafter, various cases of packet discard operational embodiment will be described.

Operational Embodiment (1) (Determination by Sequential Transmission of Packets Between Two Terminals: FIGS. 5-8)

In this operational embodiment, the packet discard point probing is performed based on the fact that the packet interval is shortened only when the packet discard has occurred in the high speed section (1) upon sequentially transmitting the packets between the terminals T1 and T2.

Figure 5:
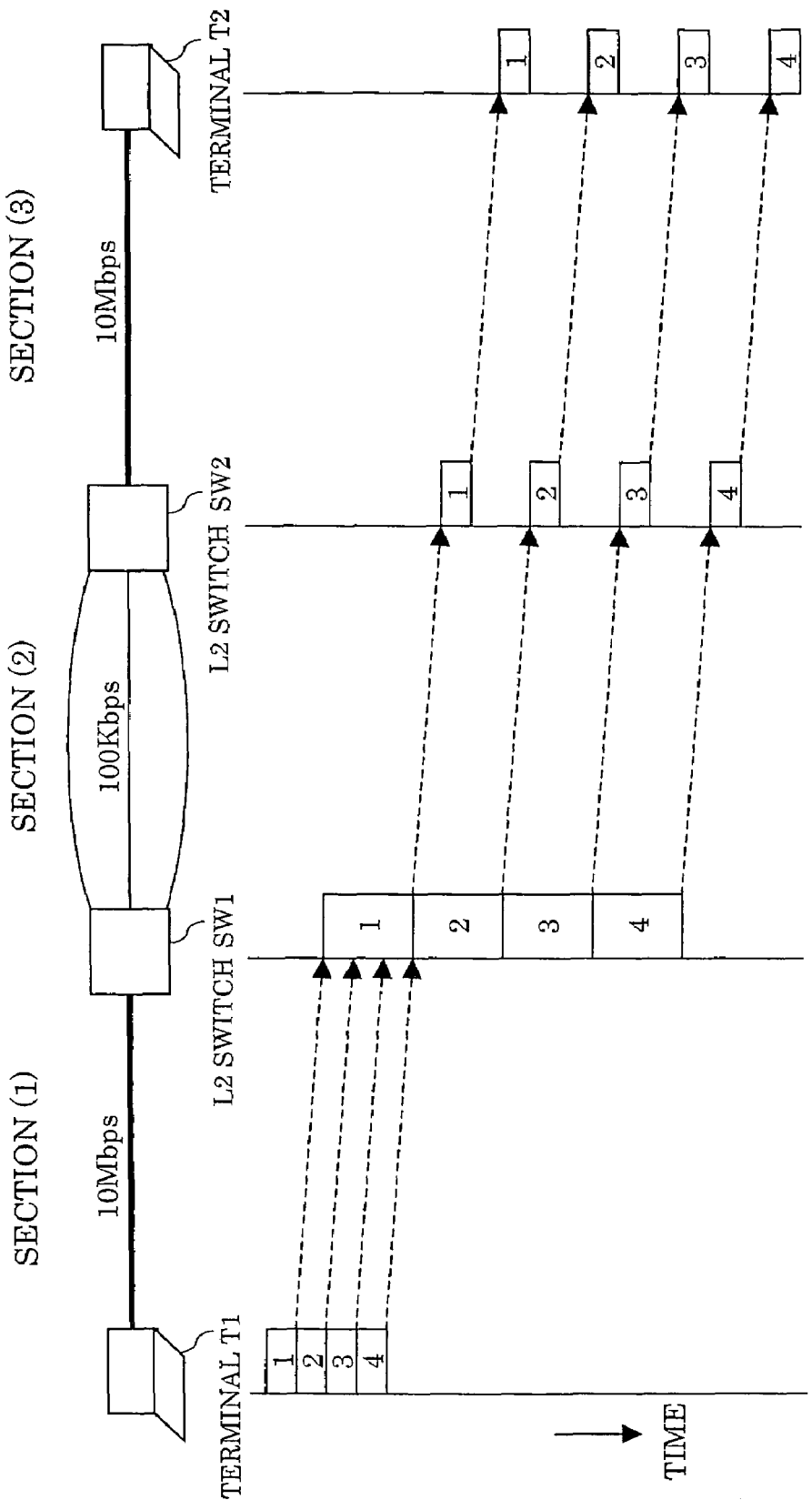
FIG. 5 is a diagram showing a packet sequence in a case where no packet discard occurs in an operational embodiment (1) of the present invention.

FIG. 5 shows a packet sequence in a case where no packet discard has occurred. In the example of FIG. 5, the packets of sequence numbers 1-4 (hereinafter, occasionally described as packets 1-4) sequentially transmitted from the transmitting terminal T1 arrive at the receiving terminal T2 through the L2 switches SW1 and SW2 without being discarded. At the terminal T2, it can be detected that no packet discard has occurred since there is found no missing sequence number.

Figure 6:
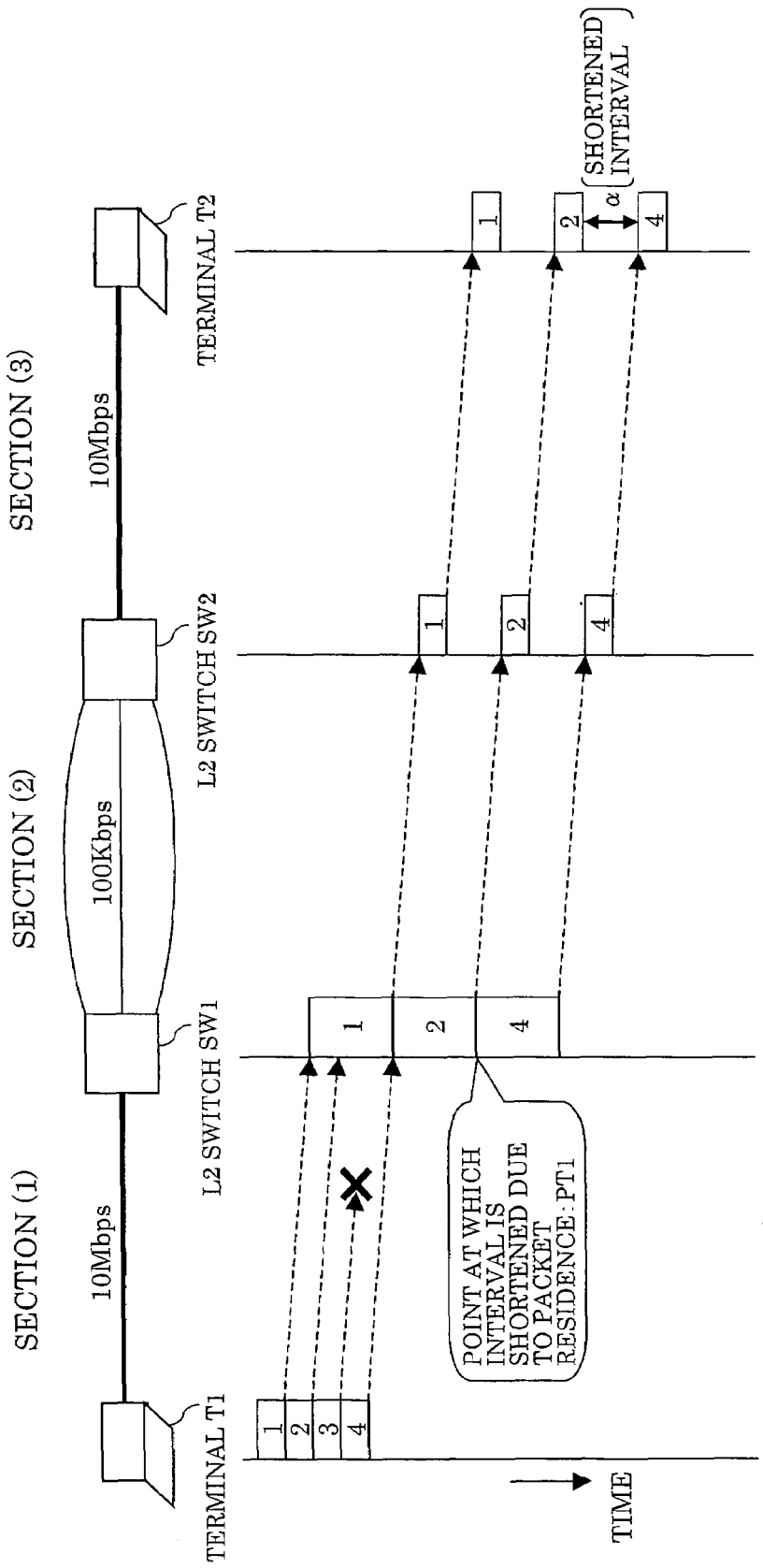
FIG. 6 is a diagram showing a packet sequence in a case where a packet discard occurs in a high speed section in an operational embodiment (1) of the present invention.

FIG. 6 shows a packet sequence in a case where the packet discard has occurred in the high speed section (1). In FIG. 6, the discard of the packet 3 occurs at the point shown by the mark x in the high speed section (1). Due to a packet residence at the L2 switch SW1 the interval between the packets 2 and 4 is shortened at a point PT1 to assumes a value $\alpha$. The receiving terminal T2 detects that the packet discard has occurred from the sequence number 3 being missing, and can determine that the packet discard has occurred in the high speed section (1) since the interval between the packets 2 and 4 is shortened.

Figure 7:
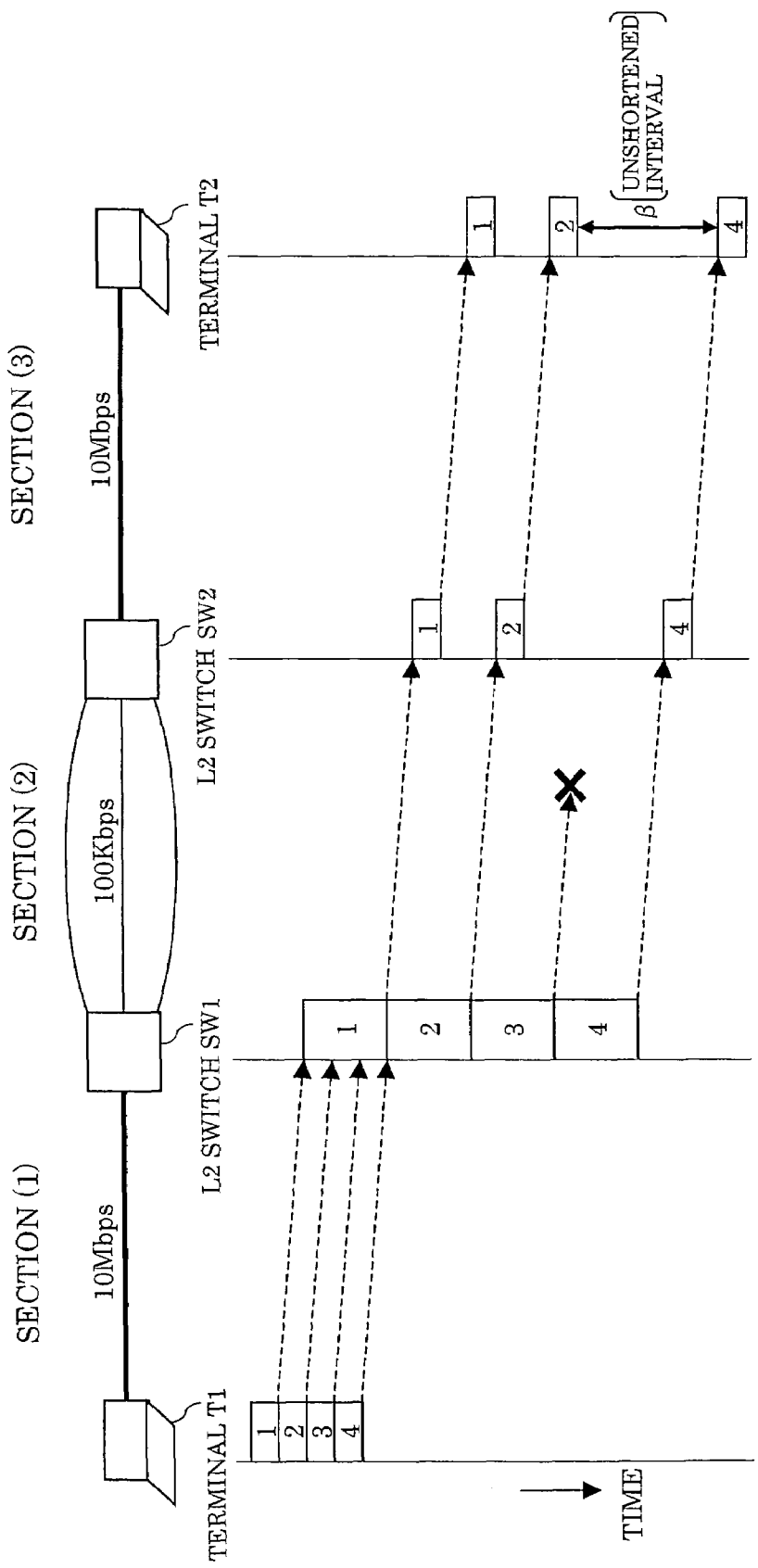
FIG. 7 is a diagram showing a packet sequence in a case where a packet discard occurs in a low speed section in an operational embodiment (1) of the present invention.

FIG. 7 shows a packet sequence in a case where the packet discard has occurred in the low speed section (2). In FIG. 7, although the discard of the packet 3 occurs (mark x) in the low speed section (2), the interval between the packets 2 and 4 remains unshortened. The receiving terminal T2 detects that the packet discard has occurred from the missing sequence number 3. However, since the interval between the packets 2 and 4=$\beta$ ($\beta$>$\alpha$) is unshortened, it can be determined that the packet discard has occurred in the low speed section (2).

Figure 8:
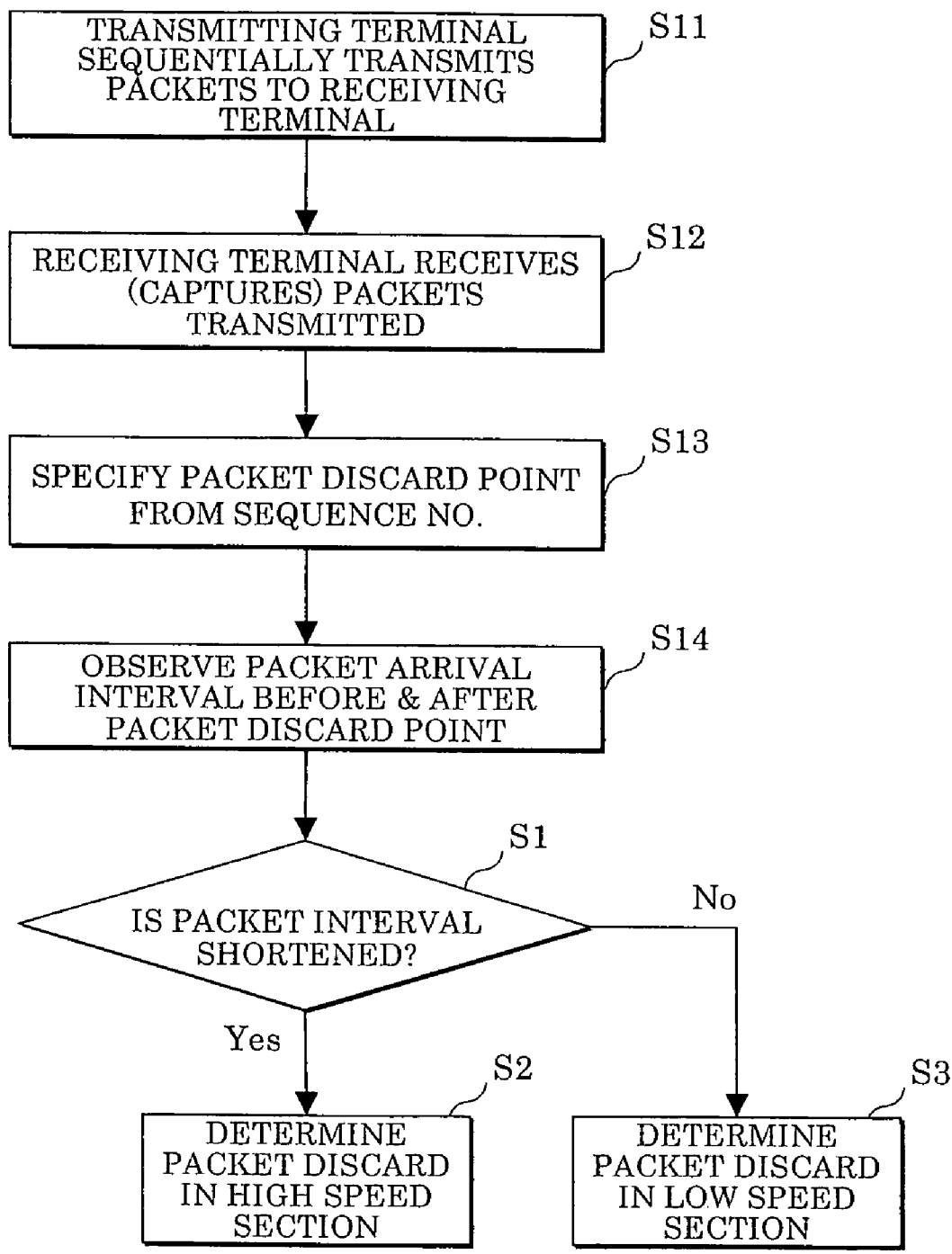
FIG. 8 is a flow chart of an operational embodiment (1) of the present invention.

FIG. 8 shows a flow chart of the operational embodiment (1). In this flow chart, only step S11 is executed by the GUI portion 101 and the inspection packet transmitter 102 of the transmitting terminal T1. Step S12 and following steps are executed by the packet capturing portion 104 and the analyzer 105 of the receiving terminal T2.

In this flow chart, when the transmitting terminal T1 sequentially transmits packets to the receiving terminal T2 (at step S11), the receiving terminal T2 receives the packets (at step S12), specifies the packet discard point (indicating which packet is discarded) from the sequence number (at step S13), and measures the packet arrival intervals before and after the packet discard point (at step S14). If the packet arrival interval=$\alpha$ as shown in FIG. 6, it is determined that the packet discard has occurred in the high speed section (1) since the packet interval is shortened due to the packet residence (at step S2). If the packet arrival interval=$\beta$ as shown in FIG. 7, it is determined that the packet discard has occurred in the low speed section (2) since the packet interval is unshortened (at step S3).

Operational Embodiment (2) (Determination by Sequential Transmission of Probing Packets: FIGS. 9-12)

In this operational embodiment, the packet discard point probing is performed by noticing that the packet interval is shortened only when the probing packets are sequentially transmitted and the packet discard has occurred in the high speed section in the up direction. In this operational embodiment (2), both of the transmission processing and the packet discard point determination processing are performed at the transmitting terminal T1 shown in FIG. 4.

Figure 9:
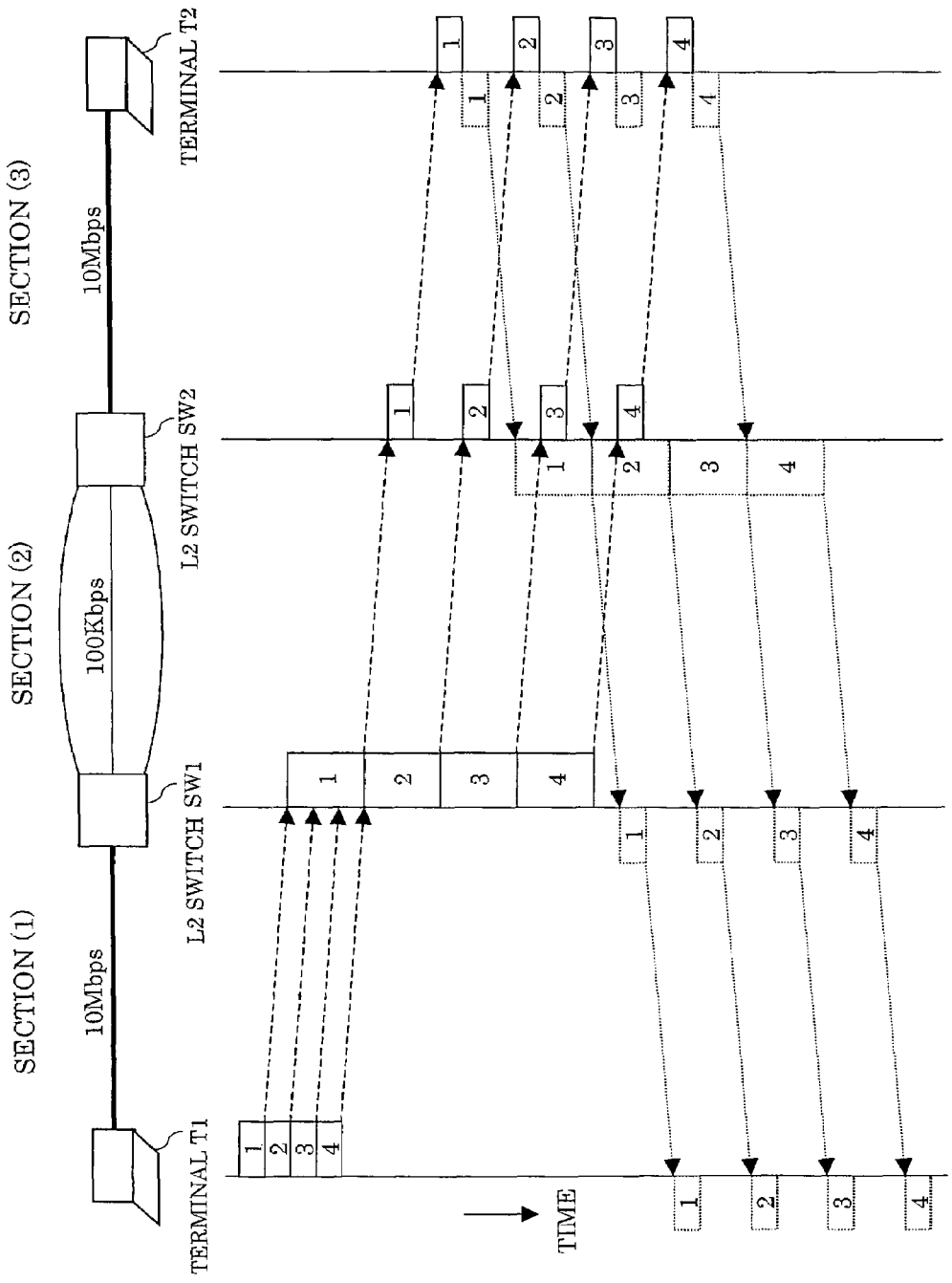
FIG. 9 is a diagram showing a packet sequence in a case where no packet discard occurs in an operational embodiment (2) of the present invention.

FIG. 9 shows a packet sequence in a case where no packet discard has occurred in the same way as the operational embodiment (1) of FIG. 5. As shown in FIG. 9, the packets 1-4 transmitted from the probing terminal T1 are transmitted to the probed terminal T2 through the L2 switches SW1 and SW2. The terminal T1 having received probing response packets 1-4 from the terminal T2 can recognize that no packet discard has occurred since there is found no missing packet sequence number.

Figure 10:
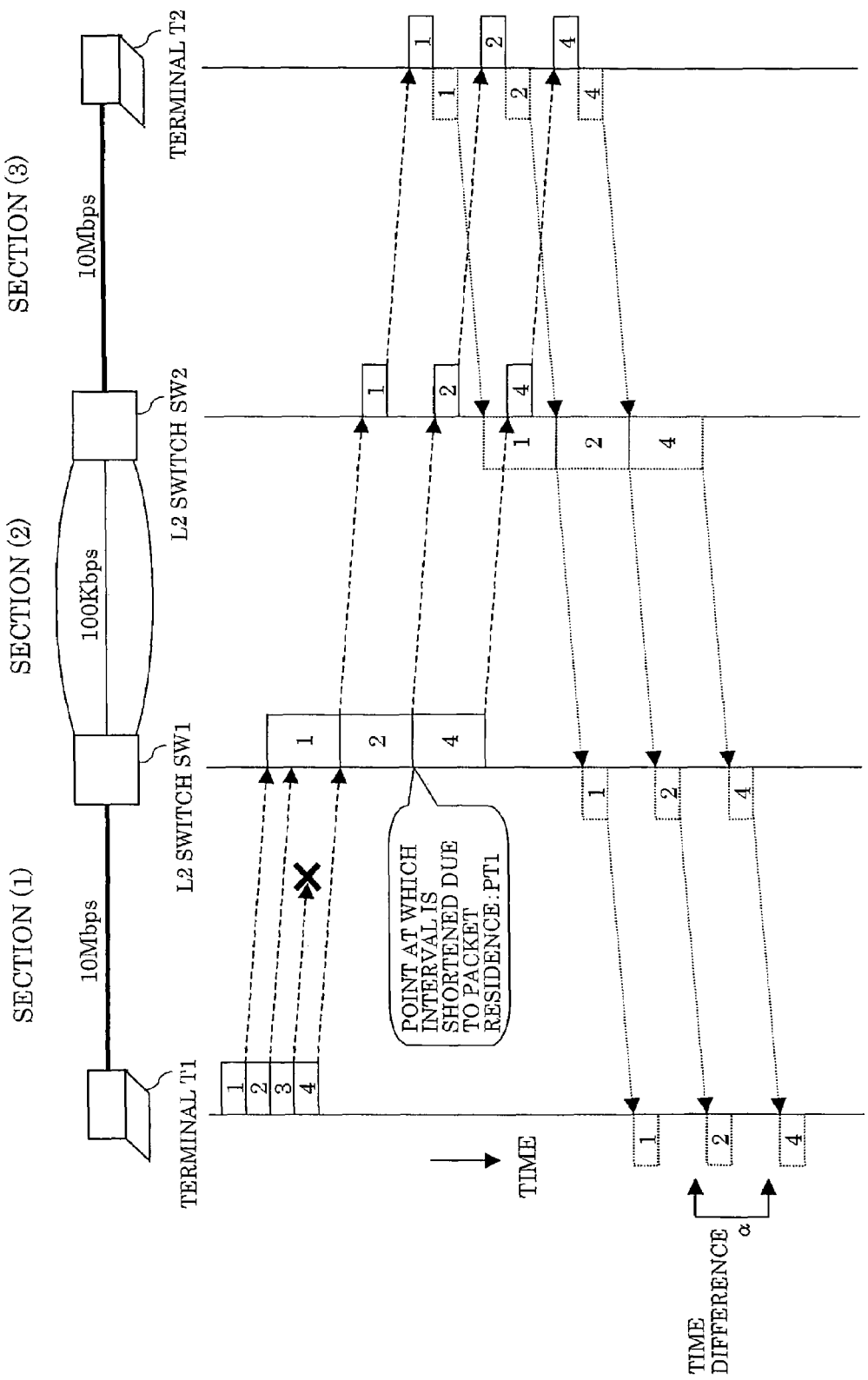
FIG. 10 is a diagram showing a packet sequence in a case where a packet discard occurs in a high speed section in an up direction in an operational embodiment (2) of the present invention.

FIG. 10 shows a packet sequence in a case where a packet discard has occurred in the high speed section (1) in the up direction. In FIG. 10, the discard of the packet 3 occurs in the high speed section (1), and the packets are transmitted to the terminal T2 through the L2 switch SW2 with the interval between the packets 2 and 4 being shortened at the point PT1 due to the packet residence at the L2 switch SW1. The terminal T2 returns the probing response packets 1, 2, and 4 at intervals of the received packets.

The probing terminal T1 identifies that the packet discard has occurred since the sequence number 3 of the probing response packet is omitted, and can determine that the packet discard has occurred in the high speed section (1) in the up direction since the interval between the packets 2 and 4 which is originally β is shortened to α.

Figure 11:
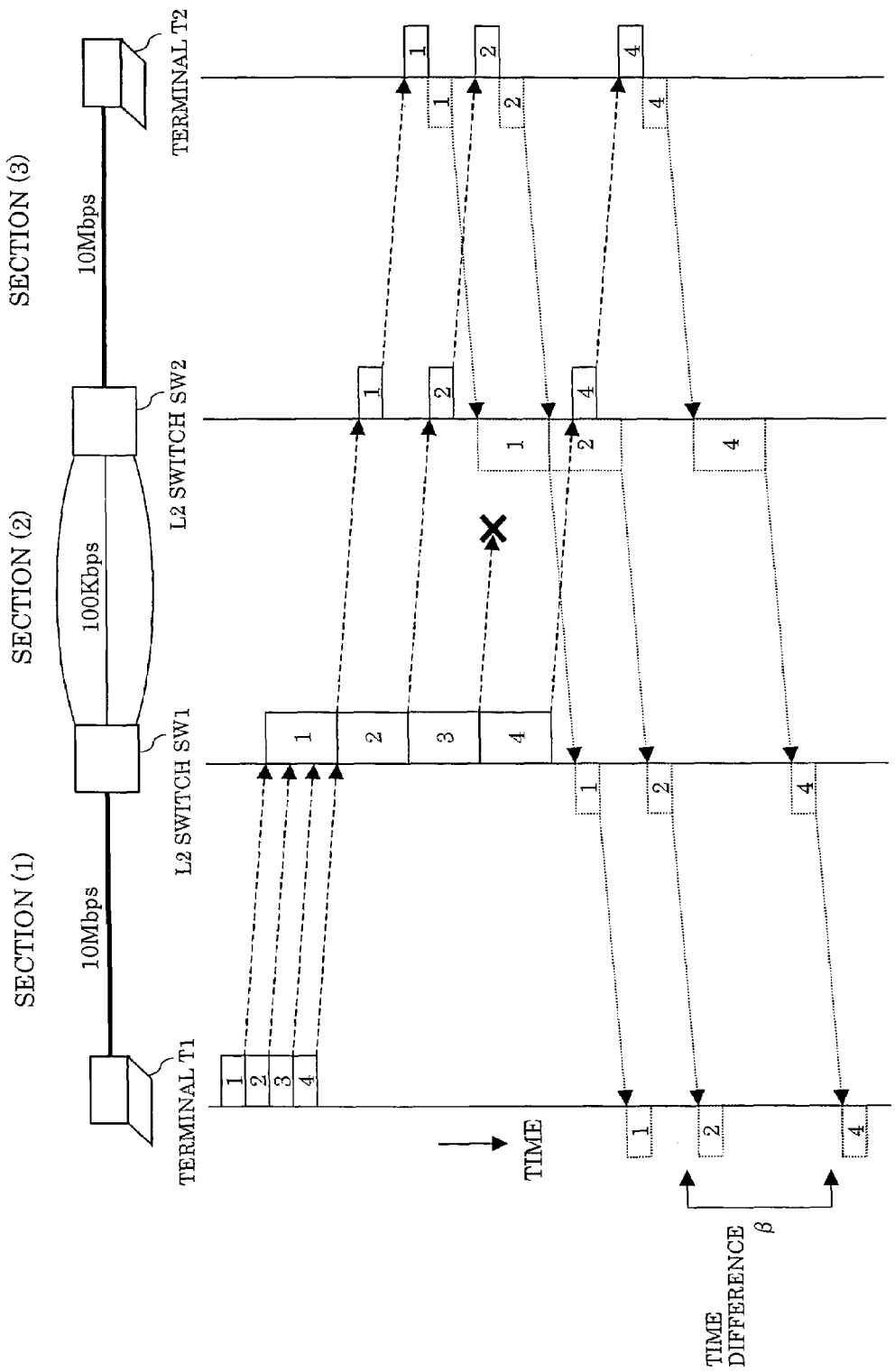
FIG. 11 is a diagram showing a packet sequence in a case where a packet discard occurs in a section other than a high speed section in an up direction in an operational embodiment (2) of the present invention.

FIG. 11 shows a packet sequence in a case where packet discard has occurred in the low speed section (2) in the up direction. As shown in FIG. 11, the discard of the packet 3 occurs in the low speed section (2), and the interval between the packets 2 and 4 remains the original unshortened value β. The probing terminal T1 identifies that the packet discard has occurred from the missing probing response packet 3, and can determine that the packet discard has occurred in a section other than the high speed section (1) in the up direction since the interval between the packets 2 and 4 is unshortened.

Figure 12:
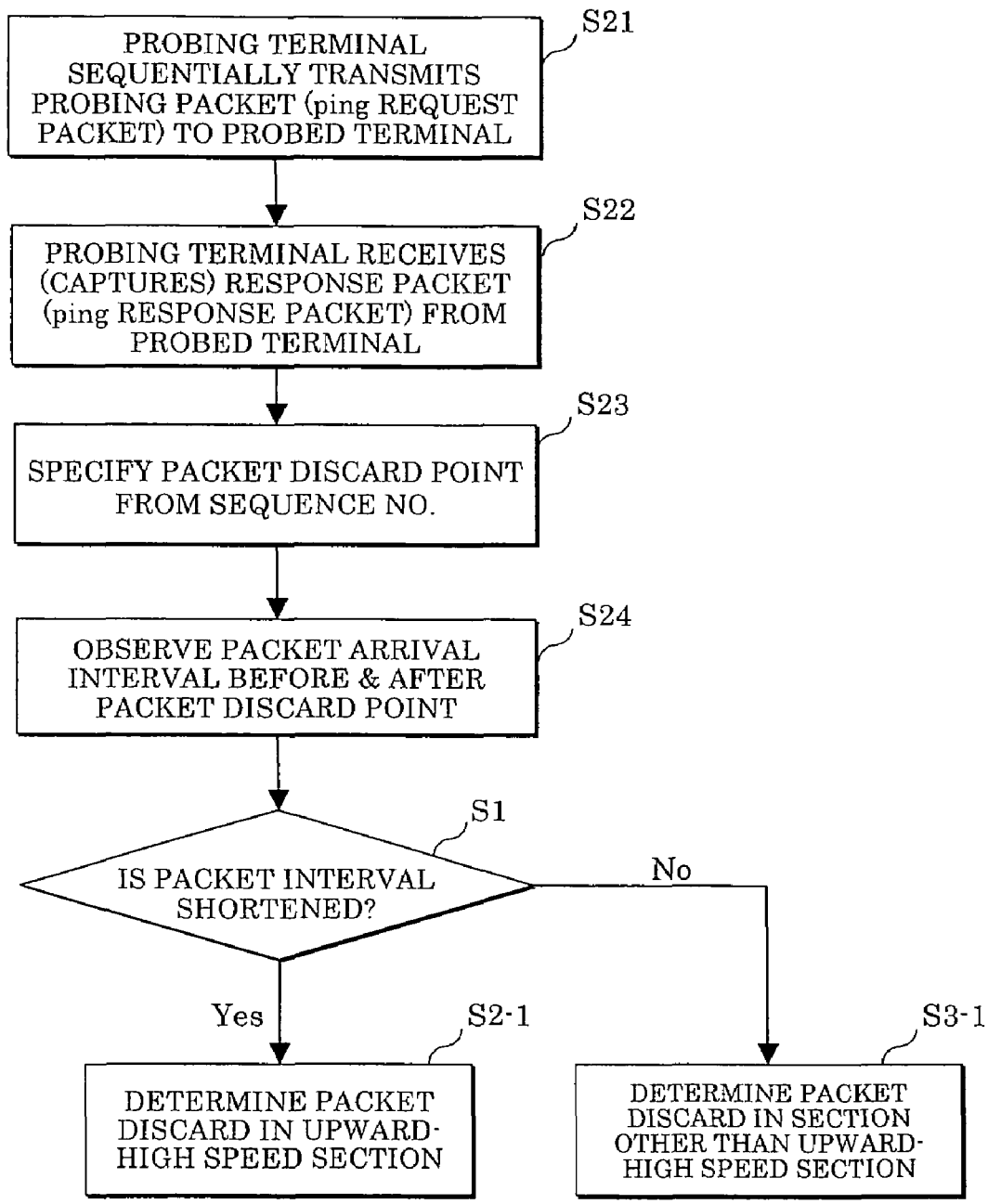
FIG. 12 is a flow chart of an operational embodiment (2) of the present invention.

FIG. 12 shows a flow chart of the operational embodiment (2). This can be executed only by the terminal T1 as mentioned above. In this flow chart, the probing terminal T1 sequentially transmits the probing packets (ping request packets) to the probed terminal T2 (at step S21), receives (captures) the response packets (ping response packets) (at step S22), specifies the packet discard point from the sequence number (at step S23), measures the packet arrival interval before and after the packet discard point (at step S24), checks whether or not the interval is shortened (at step S1), and determines that the packet discard has occurred in the high speed section in the up direction when it is shortened (at step S2-1) and that the packet discard has occurred in a section other than the high speed section in the up direction when it is unshortened (at step S3-1).

Operational Embodiment (3) (Determination by Sequentially Transmitting Probing Packets (Utilizing IP Time Stamp): FIGS. 13-16)

In this operational embodiment, the packet discard point probing is performed by noticing that an IP time stamp difference is reduced only when the packet discard occurs in the high speed section in the up direction by sequentially transmitting the probing packets utilizing the IP time stamp.

Figure 13:
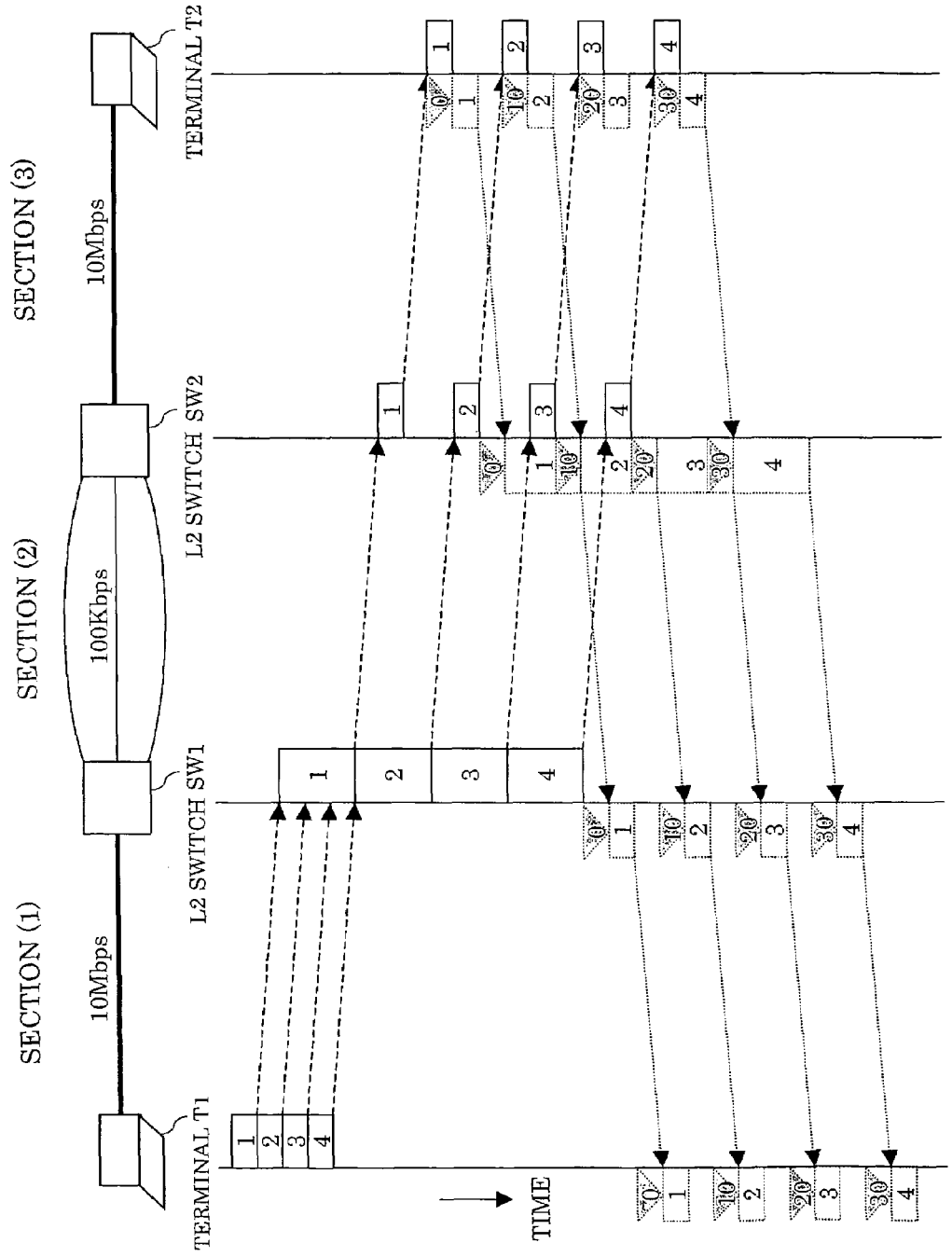
FIG. 13 is a diagram showing a packet sequence in a case where no packet discard occurs in an operational embodiment (3) of the present invention.

FIG. 13 shows a packet sequence in a case where no packet discard occurs. As shown in FIG. 13, the probing packet includes contents for setting an IP time stamp indicating the packet interval at the probed terminal T2. Since IP time stamps 0, 10, 20, 30 are respectively set to the probing response packets 1-4 from the terminal T2 to be returned to the terminal T1, the terminal T1 can recognize that no packet discard has occurred if there is found no missing sequence number.

Figure 14:
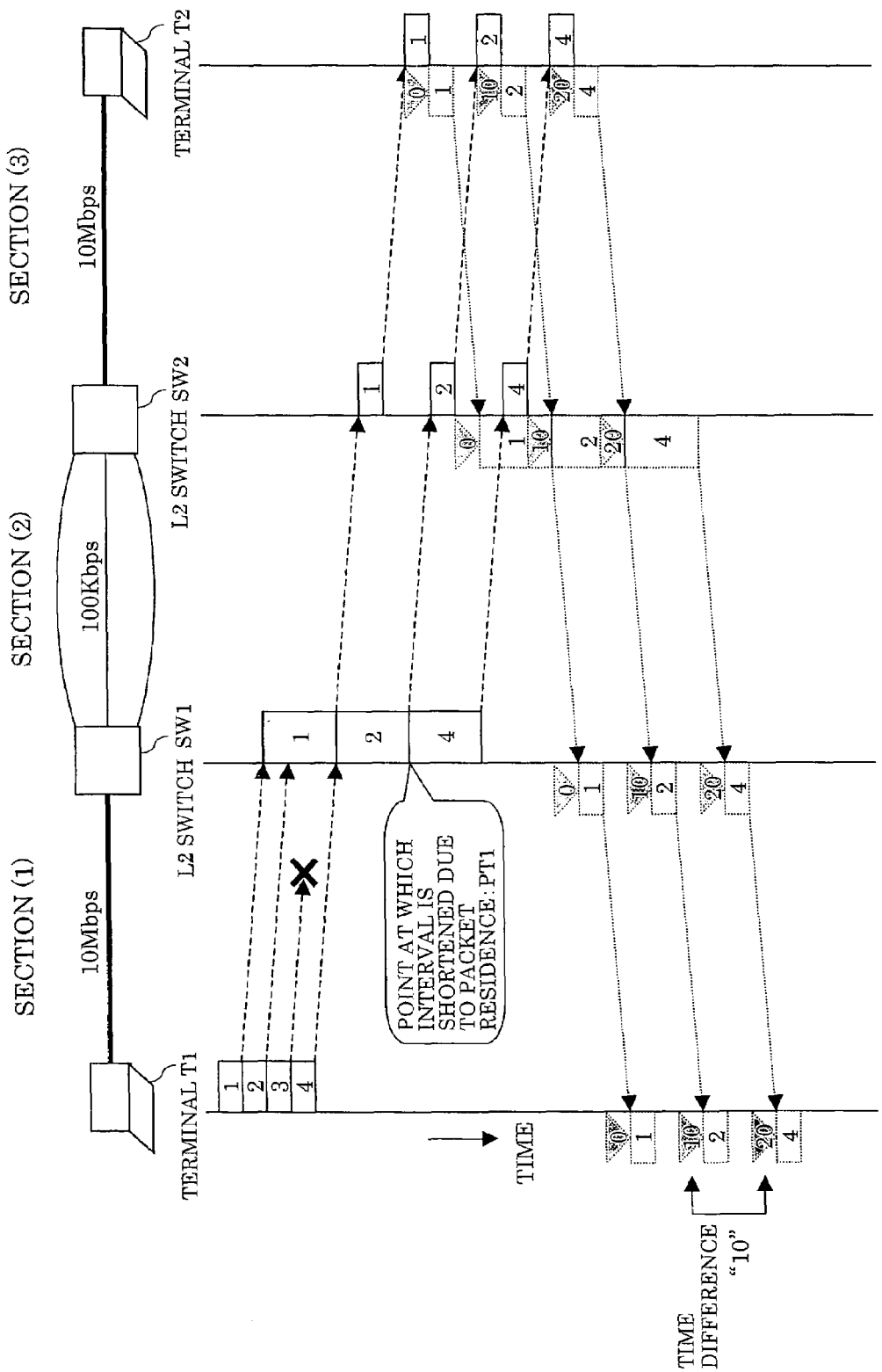
FIG. 14 is a diagram showing a packet sequence in a case where a packet discard occurs in a high speed section in an up direction in an operational embodiment (3) of the present invention.

FIG. 14 shows a packet sequence in a case where the packet discard has occurred in the high speed section (1) in the up direction. As shown in FIG. 14, the discard of the packets 3 has occurred in the high speed section (1), and the interval between the packets 2 and 4 is shortened at the time PT1 due to the packet residence at the L2 switch SWI. The probing terminal T1 can determine that the packet discard has occurred in the high speed section (1) in the up direction since the IP time stamps "10" is followed by "20" instead of "30", and the IP time stamp difference is reduced due to the missing probing response packet 3.

Figure 15:
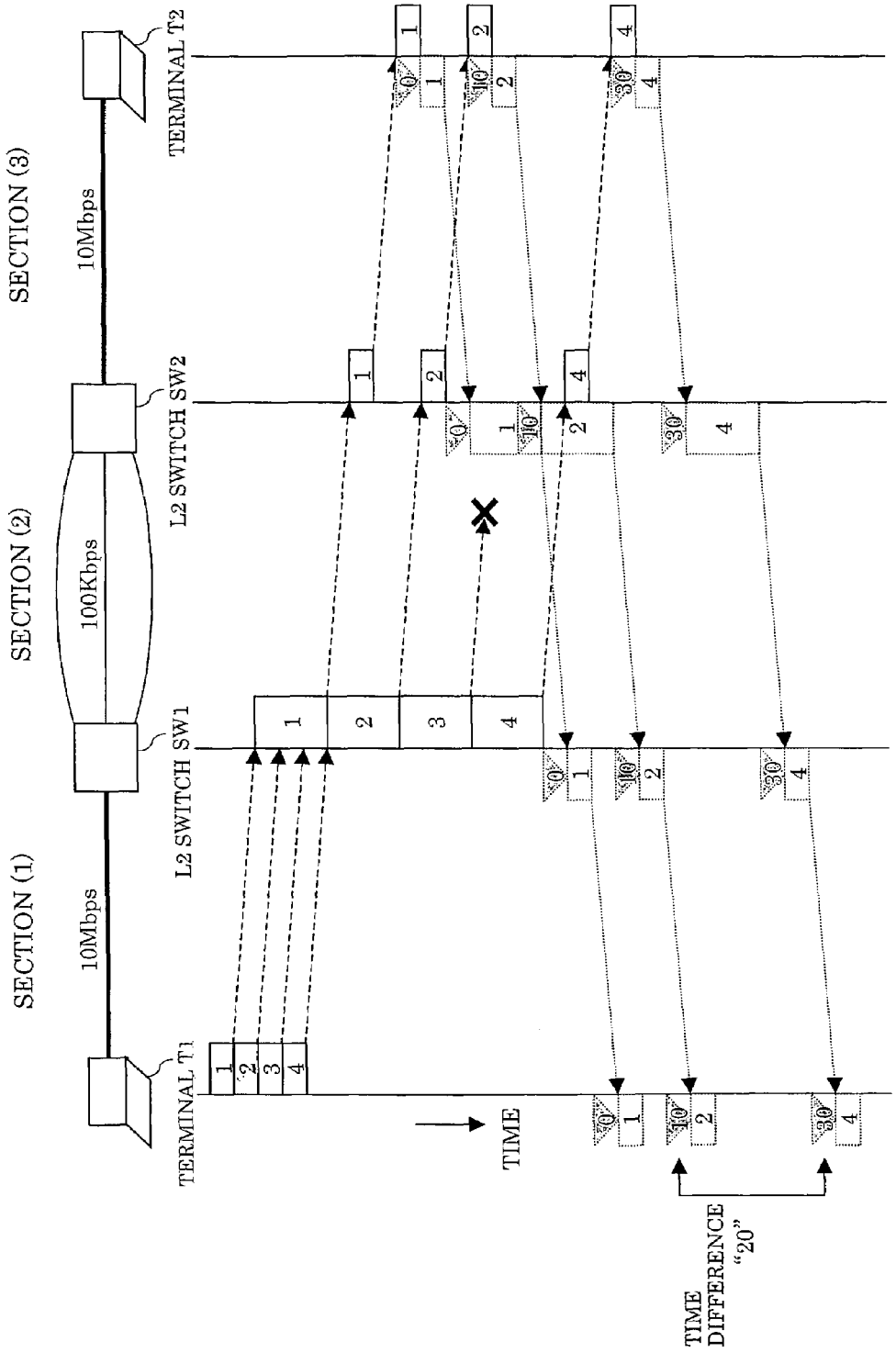
FIG. 15 is a diagram showing a packet sequence in a case where a packet discard occurs in a section other than a high speed section in an up direction in an operational embodiment (3) of the present invention.

FIG. 15 shows a packet sequence in a case where the packet discard has occurred in the low speed section (2) in the up direction. In FIG. 15, the discard of the packet 3 occurs in the low speed section (2), and the interval between the packets 2 and 4 remains unshortened in the same way as the case of FIG. 11. The probing terminal T1 identifies that the packet discard has occurred from the missing probing response packet 3, and can determine that the packet discard has occurred in a section other than the high speed section (1) in the up direction since the IP time stamp difference between the packets 2 and 4 is "30-10=20", remaining unshortened.

Figure 16:
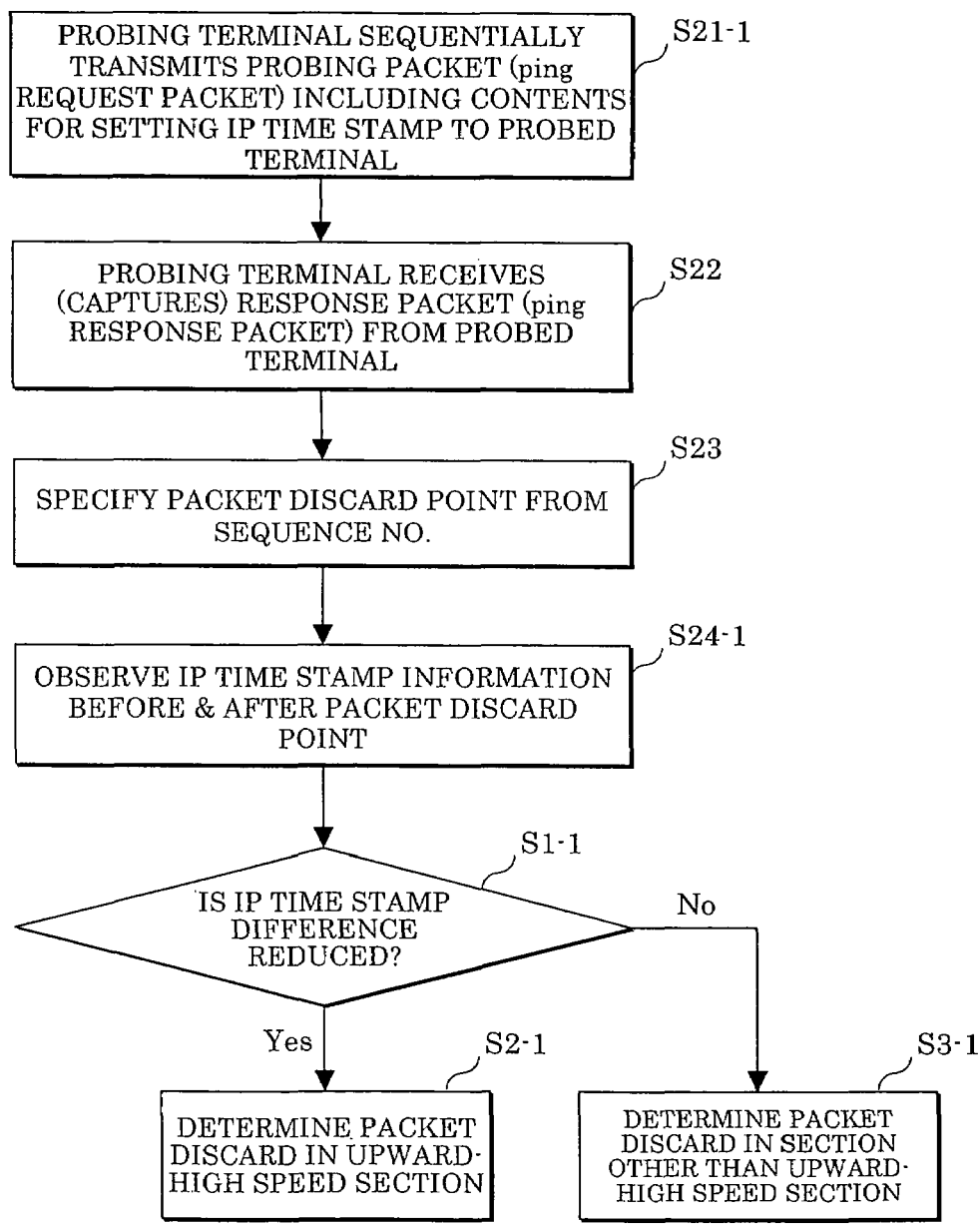
FIG. 16 is a flow chart of an operational embodiment (3) of the present invention.

FIG. 16 shows a flow chart of the operational embodiment (3), which can be also executed only by the terminal T1. In this flow chart, the probing terminal T1 sequentially transmits the probing packets (ping request packets) including contents for setting IP time stamps to the probed terminal T2 (at step S21-1), receives (captures) the response packets (ping response packets) (at step S22), specifies the packet discard point from the sequence number (at step S23), detects the IP time stamp difference before and after the packet discard point (at step S24-1), checks whether or not the IP time stamp difference is reduced (at step S1-1), and determines that the packet discard has occurred in the high speed section in the up direction if the difference is reduced (at step S2-1), and that the packet discard has occurred in a section other than the high speed section in the up direction if it is not reduced (at step S3-1).

Operational Embodiment (4) (Determination by a Large Size Probing Packet: FIGS. 17-20)

In this operational embodiment, the packet discard point probing is performed by noticing that as for a probing packet (e.g. ping request/response packet of 15,000 bytes) having a size large enough to cause an IP fragment, the packet interval is shortened when the packet discard has occurred in the high speed section in the down direction, the packet interval is unshortened when the packet discard has occurred in the low speed section in the down direction, and the probing response itself is not returned when the packet discard has occurred in either high or low speed section in the up direction.

Figure 17:
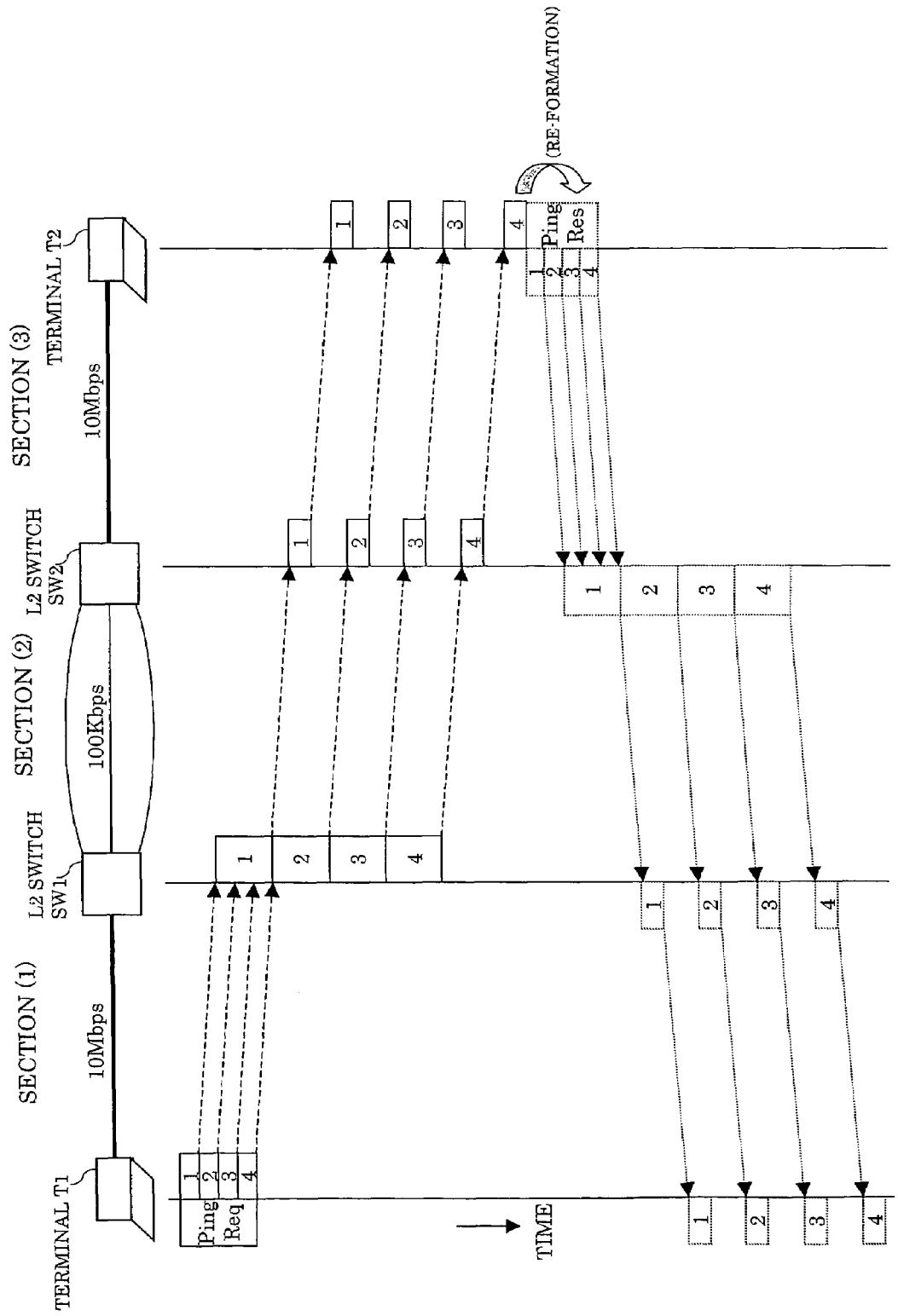
FIG. 17 is a diagram showing a packet sequence in a case where no packet discard occurs in an operational embodiment (4) of the present invention.

FIG. 17 shows a packet sequence in a case where no packet discard has occurred when a ping request packet Req divided into packets 1-4 is transmitted from the probing terminal T1 to the probed terminal T2. As shown in FIG. 17, all of the packets 1-4 are received at terminal T2 and the ping request packet is re-formed. The terminal T1 detects that there is no missing sequence number in the transmitted probing response packet Res, thereby recognizing that no packet discard has occurred.

Figure 18:
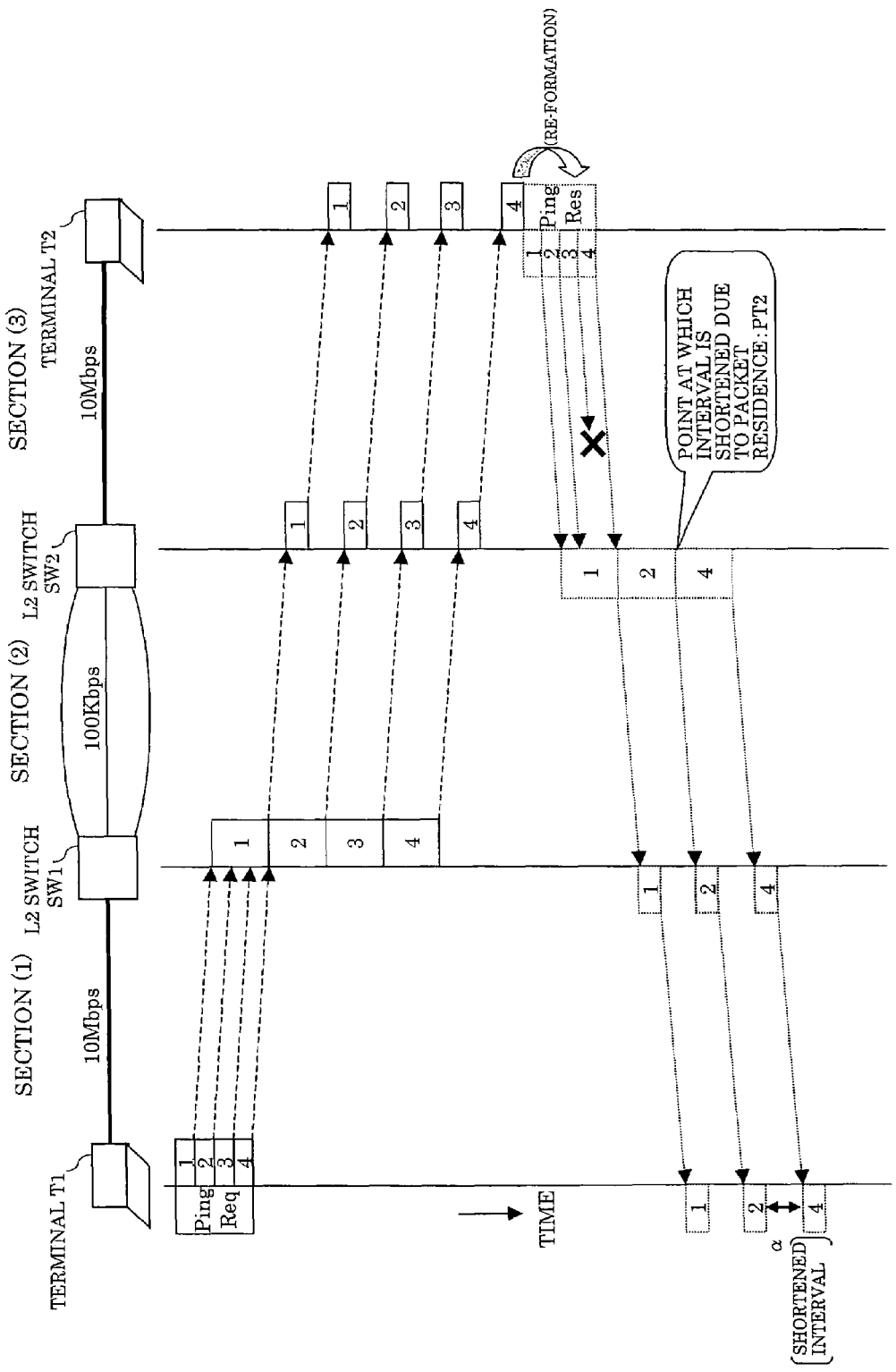
FIG. 18 is a diagram showing a packet sequence in a case where a packet discard occurs in a high speed section in a down direction in an operational embodiment (4) of the present invention.

FIG. 18 shows a packet sequence in a case where the packet discard has occurred in the high speed section (3) in the down direction. As shown in FIG. 18, when the discard of the packet 3 in the probing response packet Res has occurred in the high speed section (3), the interval between the packets 2 and 4 is shortened to α at the point PT2 due to the packet residence at the L2 switch SW2. The probing terminal T1 identifies that the packet discard has occurred from the missing sequence number 3 in the probing response packet Res, and can determine that the packet discard has occurred in the high speed section (3) in the down direction since the interval between the packets 2 and 4 is shortened to α.

Figure 19:
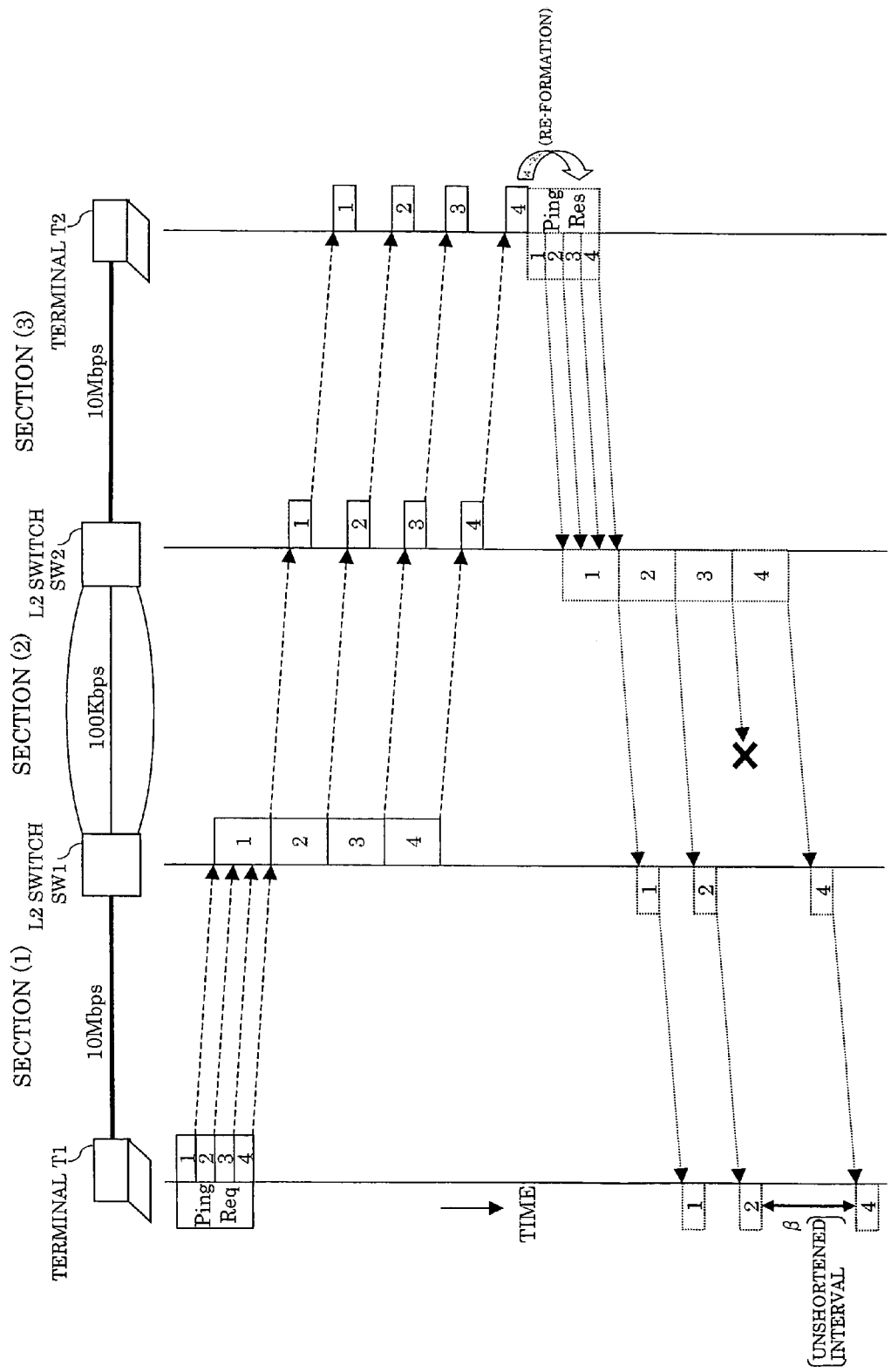
FIG. 19 is a diagram showing a packet sequence in a case where a packet discard occurs in a low speed section in a down direction in an operational embodiment (4) of the present invention.

FIG. 19 shows a packet sequence in a case where the packet discard has occurred in the low speed section (2) in the down direction. As shown in FIG. 19, although the discard of the packet 3 in the probing response packet Res occurs in the low speed section (2), the interval between the packets 2 and 4 remains unshortened. The probing terminal T1 identifies that the packet discard has occurred from the missing packet of the sequence number 3 in the probing response packet Res, and can determine that the packet discard has occurred in a section other than the high speed section (3) in the down direction since the interval between the packets 2 and 4 is β that is unshortened.

Figure 20:
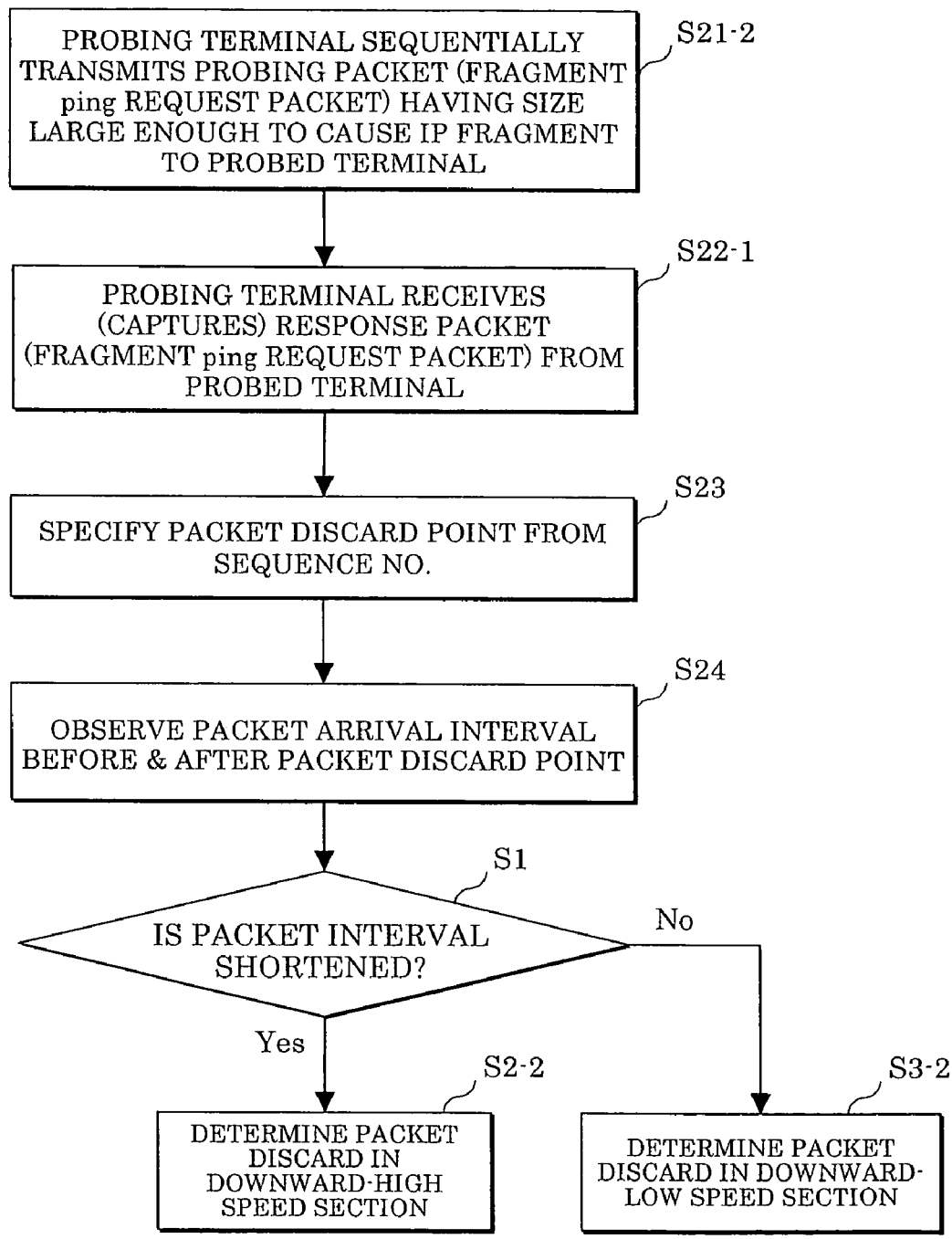
FIG. 20 is a flow chart of an operational embodiment (4) of the present invention.

FIG. 20 shows a flow chart of the operational embodiment (4), which can be also executed only by the terminal T1. In this flow chart, the probing terminal T1 sequentially transmits probing packets (fragment ping request packets) having a size large enough to cause the IP fragment to the probed terminal (at step S21-2), receives (captures) response packets (fragment ping response packets) (at step S22-1), specifies the packet discard point from the sequence number (at step S23), observes the packet arrival interval before and after the packet discard point (at step S24), checks whether or not the packet discard is shortened (at step S21), and determines that the packet discard has occurred in the high speed section in the down direction when the interval is shortened (at step S2-2), and that the packet discard has occurred in the low speed section in the down direction when it is unshortened (at step S3-2).

Operational Embodiment (5) (Determination by TCP Data Communication Packet: FIGS. 21-24)

In this operational embodiment, the packet discard point probing is performed by noticing that only when the packet discard has occurred in the high speed section in an up direction (TCP data transfer direction) the packet interval is shortened for a TCP data communication packet. Namely, there are some cases where self-clocking of controlling the transmission interval equal both at the transmission side and the reception side operates in the TCP data communication. In this case, spacing is not applied to every packet but applied to every two packets in many cases in a commercially available operation system, which is used for the present invention.

Figure 21:
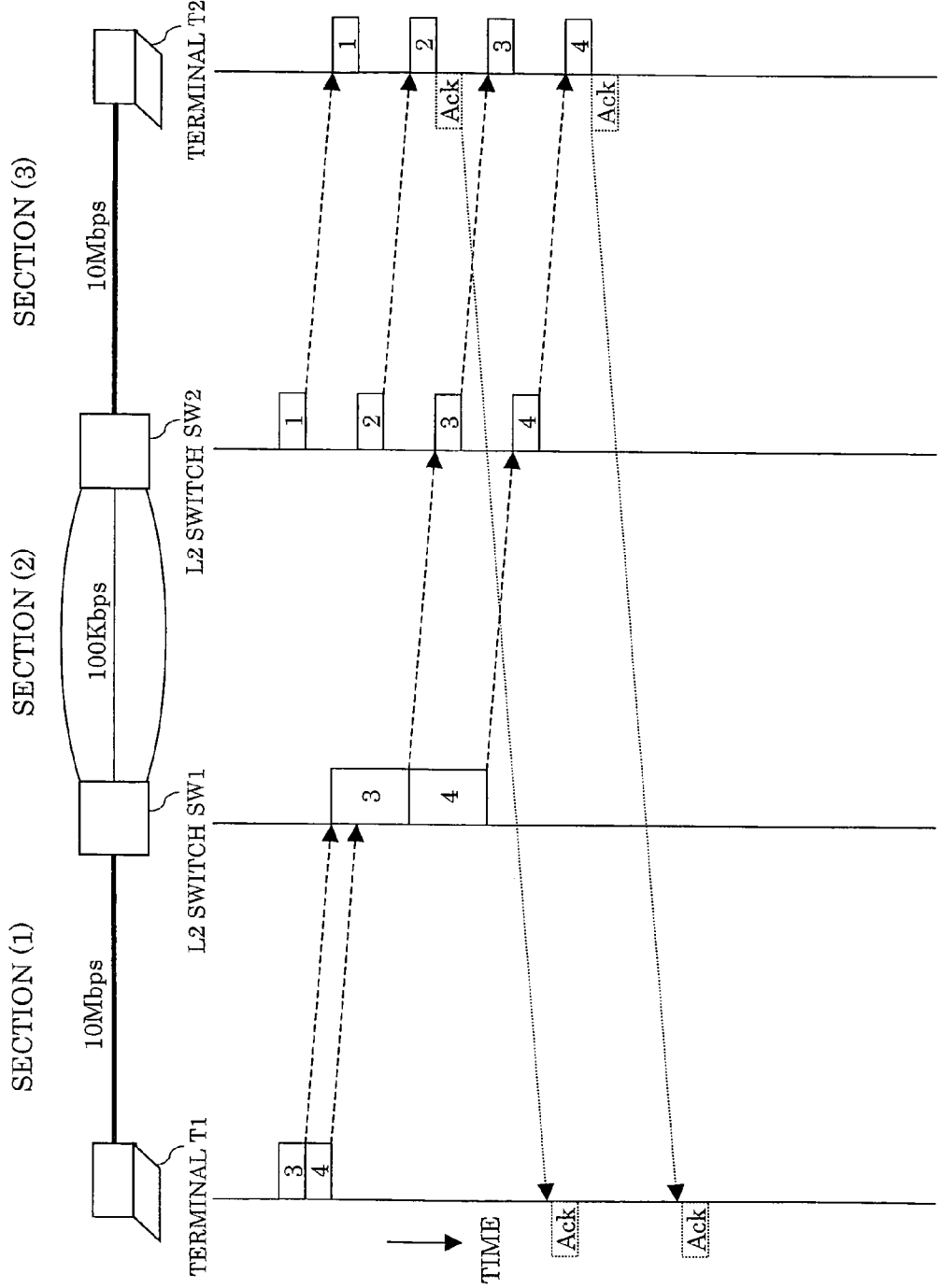
FIG. 21 is a diagram showing a packet sequence in a case where no packet discard occurs in an operational embodiment (5) of the present invention.

FIG. 21 shows a packet sequence in a case where no packet discard has occurred. As shown in FIG. 21, when the two packets 3 and 4 are transmitted from the terminal T1 to the terminal T2, the receiving terminal T2 can identify that no packet discard has occurred since there is no missing sequence number. Also, the transmitting terminal T1 can identify that no packet discard has occurred from the sequence number (indicating up to which sequence number of packets are received at the receiving side) of an Ack from the terminal T2.

Specifically, if the sequence number of the Ack having received from the terminal T2 is incremented by "two", the terminal T1 can determine that no packet discard has occurred. Accordingly, if the sequence number of the Ack is overlapped, or a Selective Ack (Sack) is used, it can be recognized that a packet discard has occurred therein.

Figure 22:
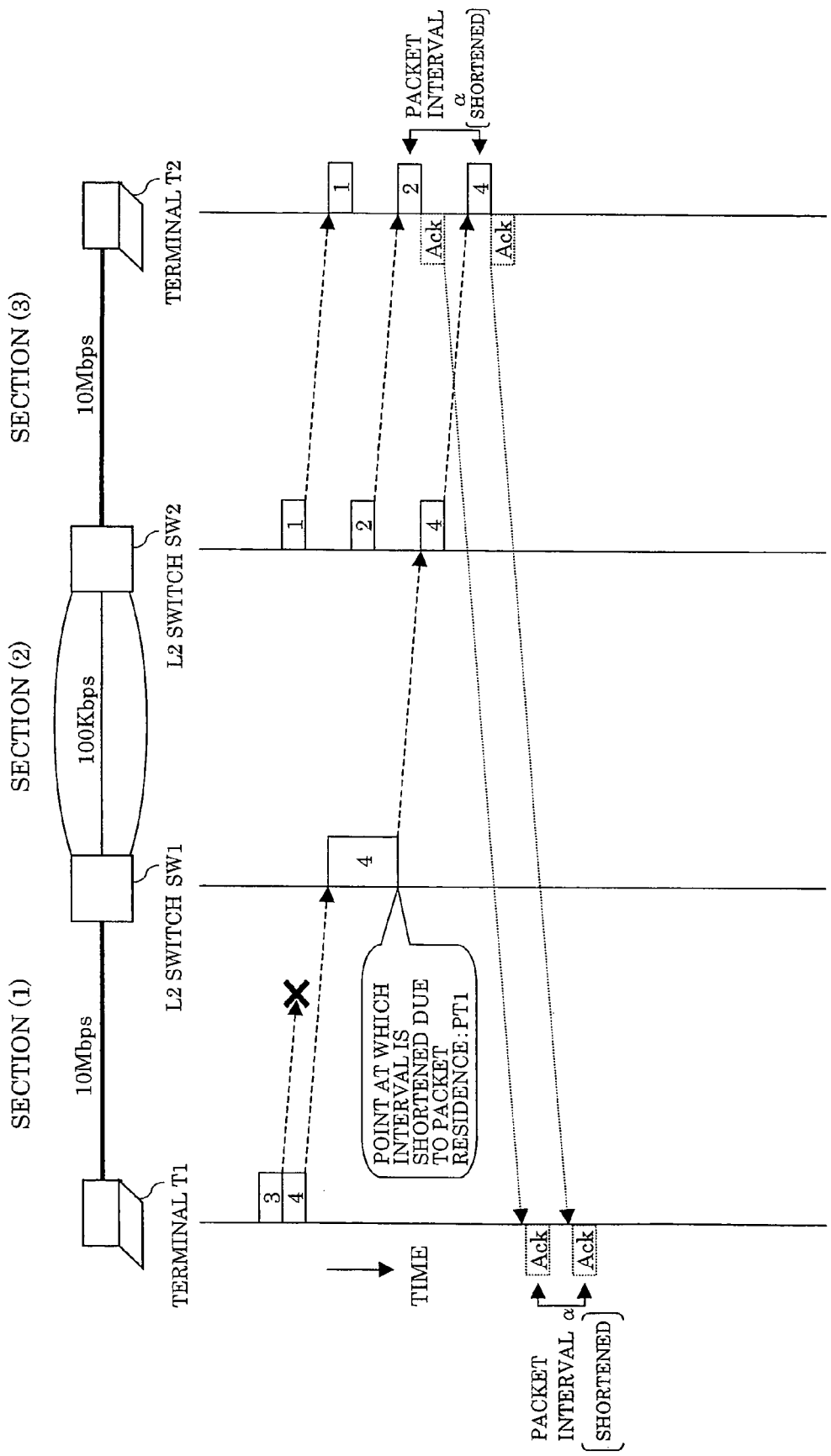
FIG. 22 is a diagram showing a packet sequence in a case where a packet discard occurs in a high speed section in an up direction in an operational embodiment (5) of the present invention.

FIG. 22 shows a packet sequence in a case where the packet discard has occurred in the high speed section (1) in the up direction. As shown in FIG. 22, the discard of the packet 3 occurs in the high speed section (1), and the interval between the packets 2 and 4 is shortened from β to α due to the packet residence at the L2 switch SW1. The receiving terminal T2 identifies that the packet discard has occurred from the missing sequence number 3, and can determine that the packet discard has occurred in the high speed section (1) in the up direction since the interval between the packets 2 and 4 is shortened to α. Furthermore, the transmitting terminal T1 identifies that the packet discard has occurred from the received Ack, and can determine that the packet discard has occurred in the high speed section (1) in the up direction since the interval of the Ack packet is shortened.

Figure 23:
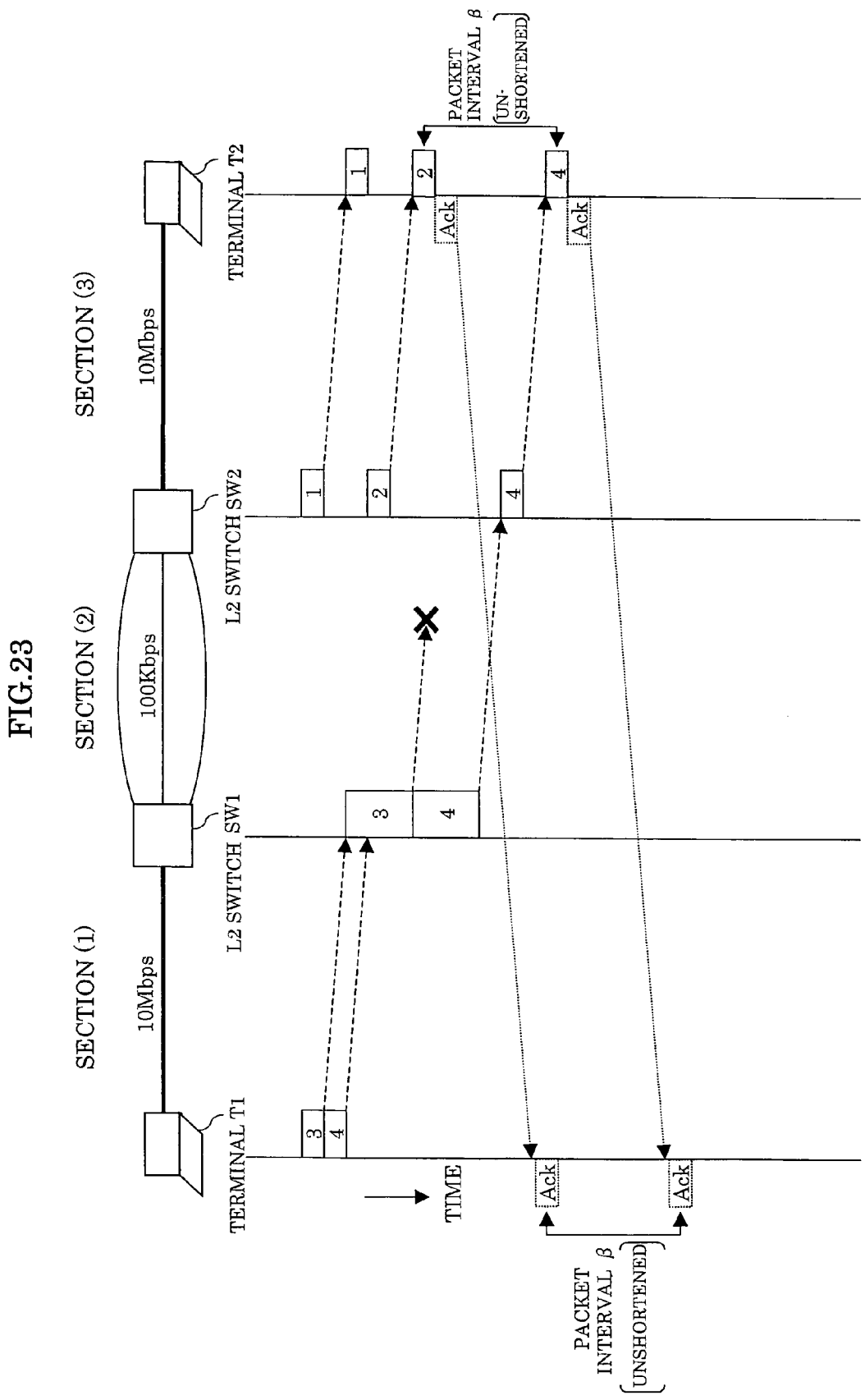
FIG. 23 is a diagram showing a packet sequence in a case where a packet discard occurs in a low speed section in an up direction in an operational embodiment (5) of the present invention.

FIG. 23 shows a packet sequence in a case where the packet discard has occurred in the low speed section (2). As shown in FIG. 23, the discard of the packet 3 occurs in the low speed section (2), and the interval between the packets 2 and 4 remains unshortened. The receiving terminal T2 identifies that the packet discard has occurred from the missing sequence number 3, and can determine that the packet discard has occurred in the low speed section in the up direction since the interval between the packets 2 and 4 is unshortened β. The transmitting terminal T1 identifies that the packet discard has occurred from the received Ack, and can determine that the packet discard has occurred in a section other than the high speed section (1) in the up direction since the Ack packet interval is β that is unshortened.

Figure 24:
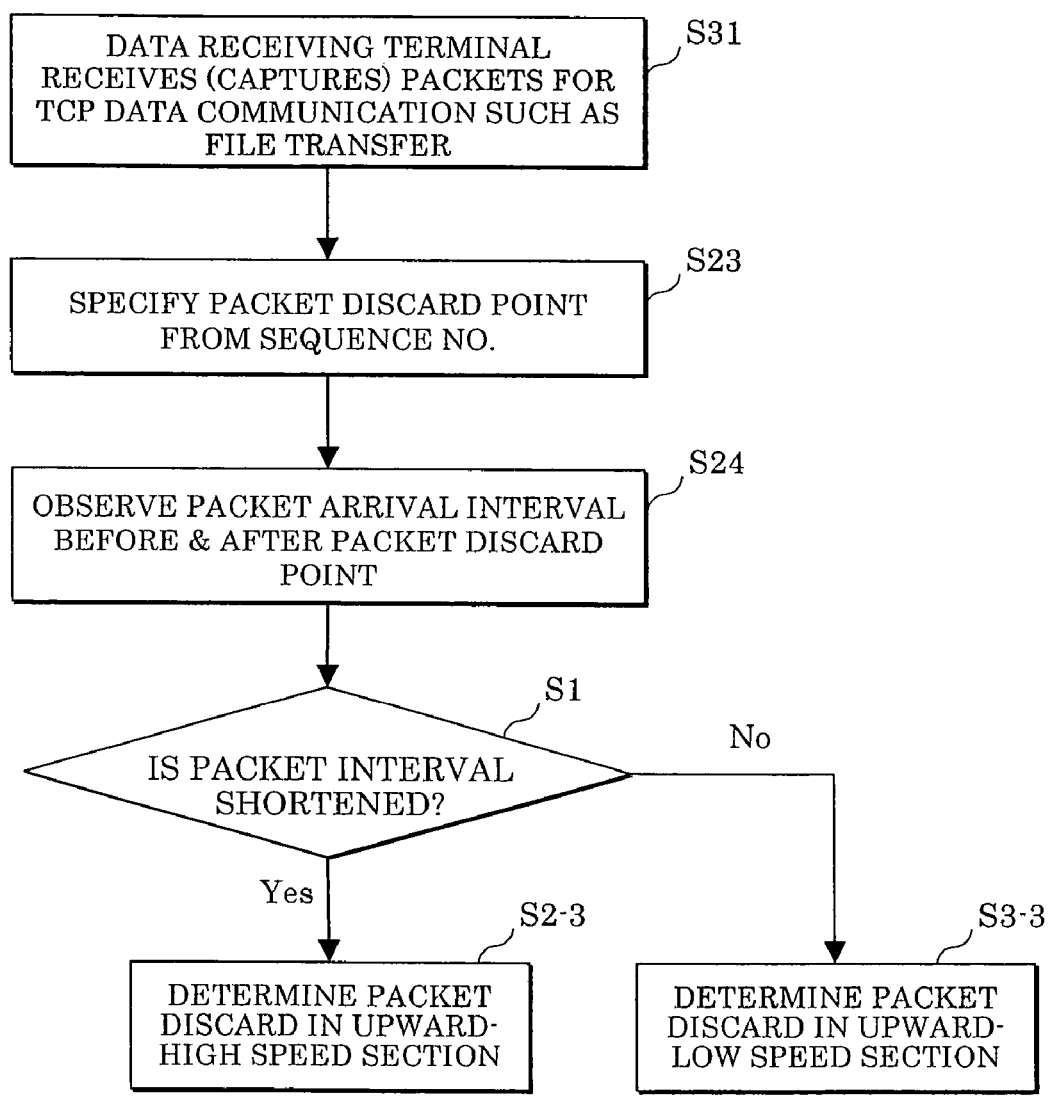
FIG. 24 is a flow chart (1) of an operational embodiment (5) of the present invention.

FIG. 24 shows a flow chart (1) of the operational embodiment (5), which shows processings at the terminal T2 of receiving packets from the terminal T1. In this flow chart, the data receiving terminal T2 receives (captures) packets of the TCP data communication such as file transfer (at step S31), specifies the packet discard point from the sequence number (at step S23), observes the packet arrival interval before and after the packet discard point (at step S24), checks whether or not the packet interval is shortened (at step S1), and determines that the packet discard has occurred in the high speed section in the up direction when the interval is shortened (at step S2-3), and that the packet discard has occurred in the low speed section in the up direction when it is unshortened (at step S3-3).

Figure 25:
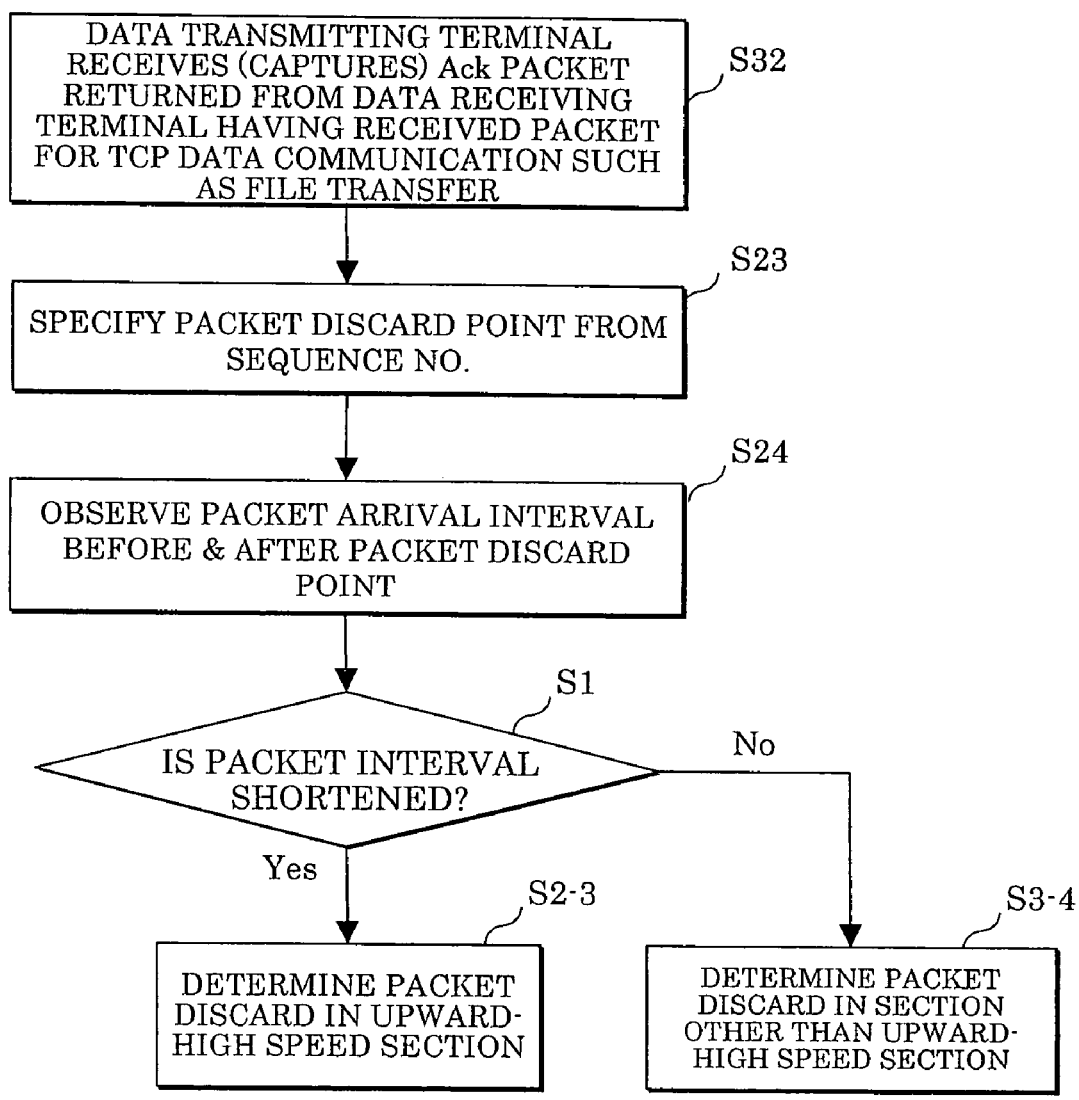
FIG. 25 is a flow chart (2) of an operational embodiment (5) of the present invention.

FIG. 25 shows a probing flow chart (2) of the operational embodiment (5), which shows processings at the terminal T1. In this flow chart, the data transmitting terminal T2 receives (captures) the Ack packet returned from the data receiving terminal having received the packet for the TCP data communication such as file transfer (at step S32), specifies the packet discard point from the sequence number (at step S23), observes the packet arrival interval before and after the packet discard point (at step S24), checks whether or not the packet interval is shortened (at step S1), and determines that the packet discard has occurred in the high speed section in the up direction when the interval is shortened (at step S2-3), and that the packet discard has occurred in a section other than the high speed section in the up direction when it is unshortened (at step S3-4).

Figure 26:
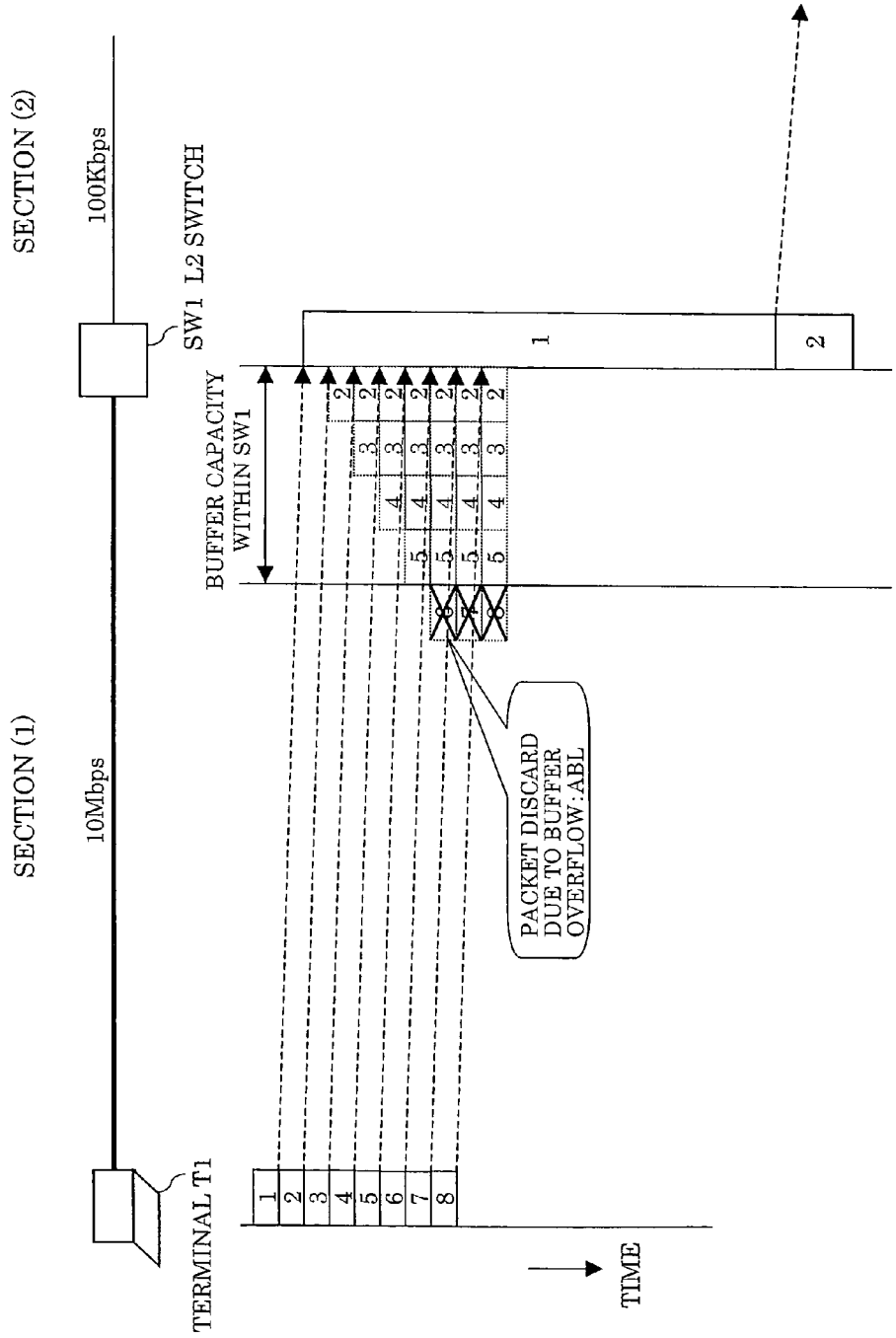
FIG. 26 is a diagram showing an example of a packet discard due to a buffer overflow in a relay device.
Figure 27:
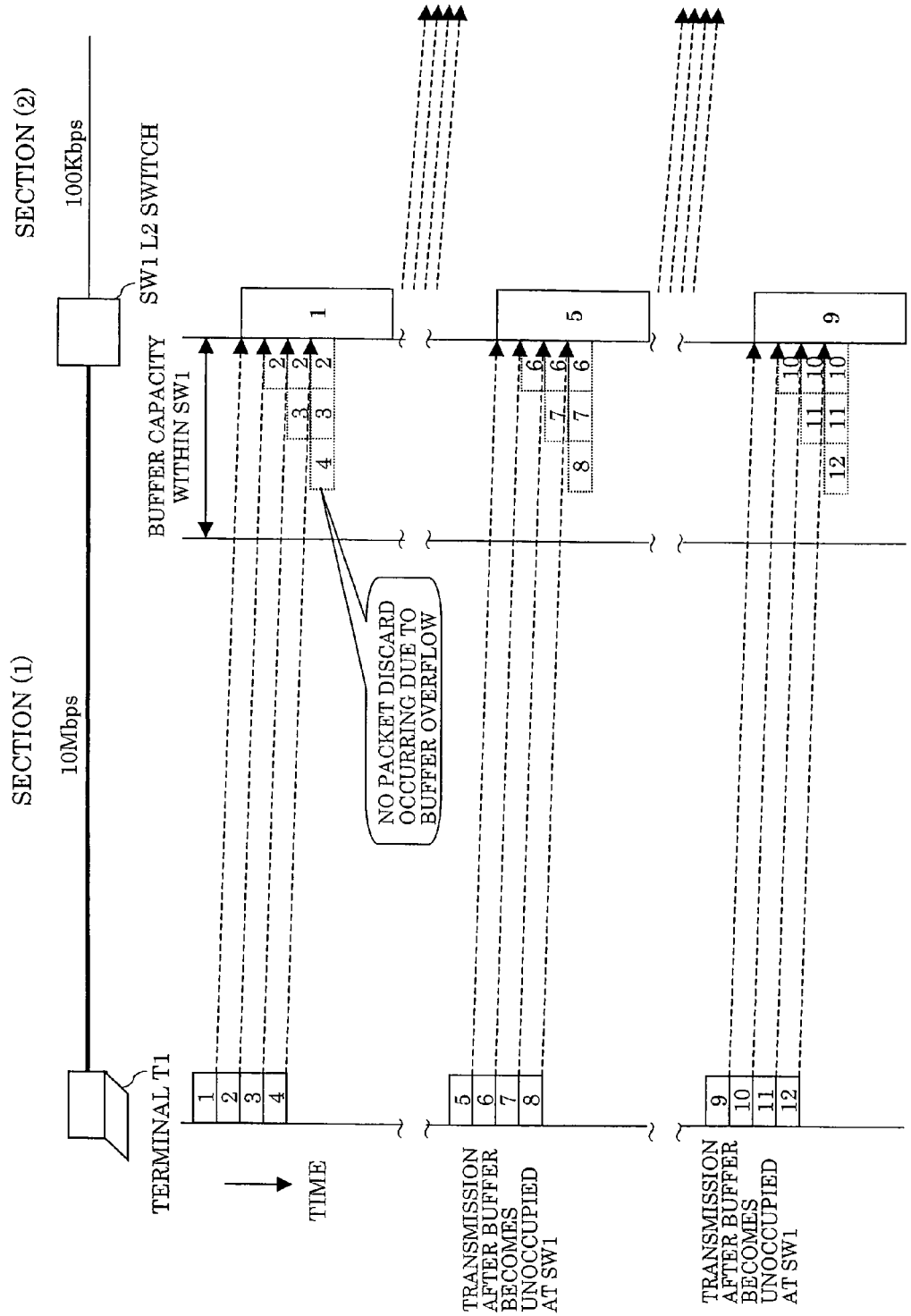
FIG. 27 is a diagram showing an example of probing which does not cause a buffer overflow in a relay device in an operational embodiment (6) of the present invention.
Figure 28:
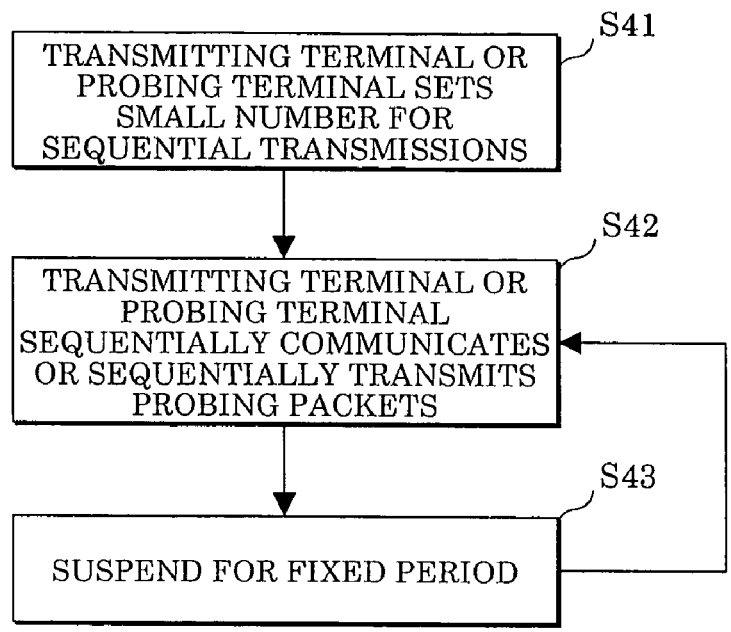
FIG. 28 is a flow chart of an operational embodiment (6) of the present invention.

Operational Embodiment (6) (Measures for Packet Discard due to Buffer Overflow in Relay Device: FIGS. 26-28)

This operational embodiment is performed by noticing that if the number of sequential transmissions is increased, the packet discard due to the packet overflow occurs in the relay device having a speed difference from a high speed to a low speed in the probing of sequentially transmitting packets, in which case the packet discard section can not be specified from the packet interval and the IP time stamp difference, so that the probing is required to be performed so as not to cause a packet discard due to the buffer overflow.

FIG. 26 is for illustrating the packet discard due to the buffer overflow in the relay device. As shown in FIG. 26, eight packets 1-8 are sequentially transmitted at one time from the terminal T1 to the L2 switch SW1 which is a relay device. When the buffer capacity is limited to 4 packets in the L2 switch SW1, the buffer overflow occurs and a discard ABL of the packets 6-8 occurs.

FIG. 27 shows an example of probing which does not cause the packet discard due to the buffer overflow in the relay device. As shown in FIG. 27, the number of packets sequentially transmitted at one time is limited to 4, and the transmission of 4 packets is repeated after the buffer becomes unoccupied at the L2 switch SW1, thereby enabling the probing without the packet discard due to the buffer overflow in the relay device to be performed.

FIG. 28 shows a flow chart of the operational embodiment (6). According to this flow chart, the transmitting terminal or the probing terminal T1 sets the number of sequential transmissions to be small (at step S41), sequentially communicates after every fixed period, or sequentially transmits the probing packets (at steps S42 and S43).

Figure 29:
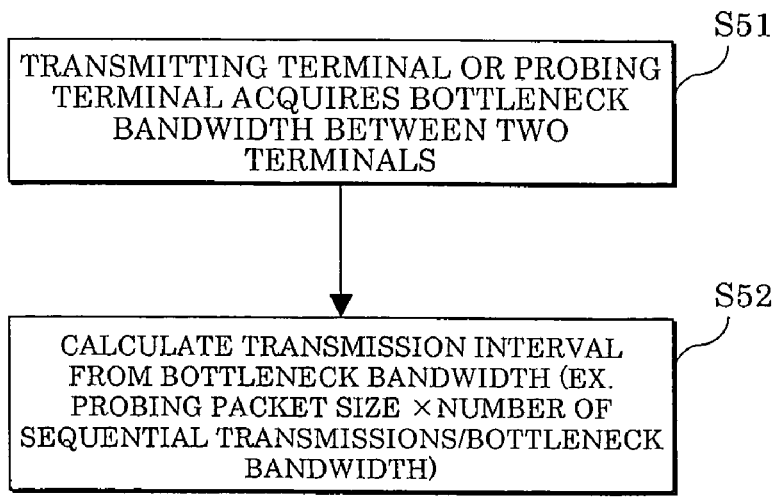
FIG. 29 is a flow chart of an operational embodiment (7) of the present invention.

Operational Embodiment (7) (Calculation of Transmission Interval: FIG. 29)

This operational embodiment uses a bottleneck bandwidth between the terminals T1 and T2 upon determining the transmission interval in the above-mentioned operational embodiment (6). Namely, it is acquired that the bottleneck bandwidth is B (bps) (at step S51), and when the number of sequential transmission at one time assumes N (units) and the packet length is L (bytes), an approximate time from sequentially transmitting the packets until reaching the destination terminal, L*N*8/B (sec.) is calculated (at step S52). The time is made the transmission interval for sequentially transmitting the packets at one time, thereby enabling a probing without the packet discard overflowing from the buffer in the relay device to be performed.

Operational Embodiment (8) (Determination Method of Discard Section from Packet Interval (Time Stamp Difference): FIGS. 30A-30C and FIG. 31)

Figure 1:
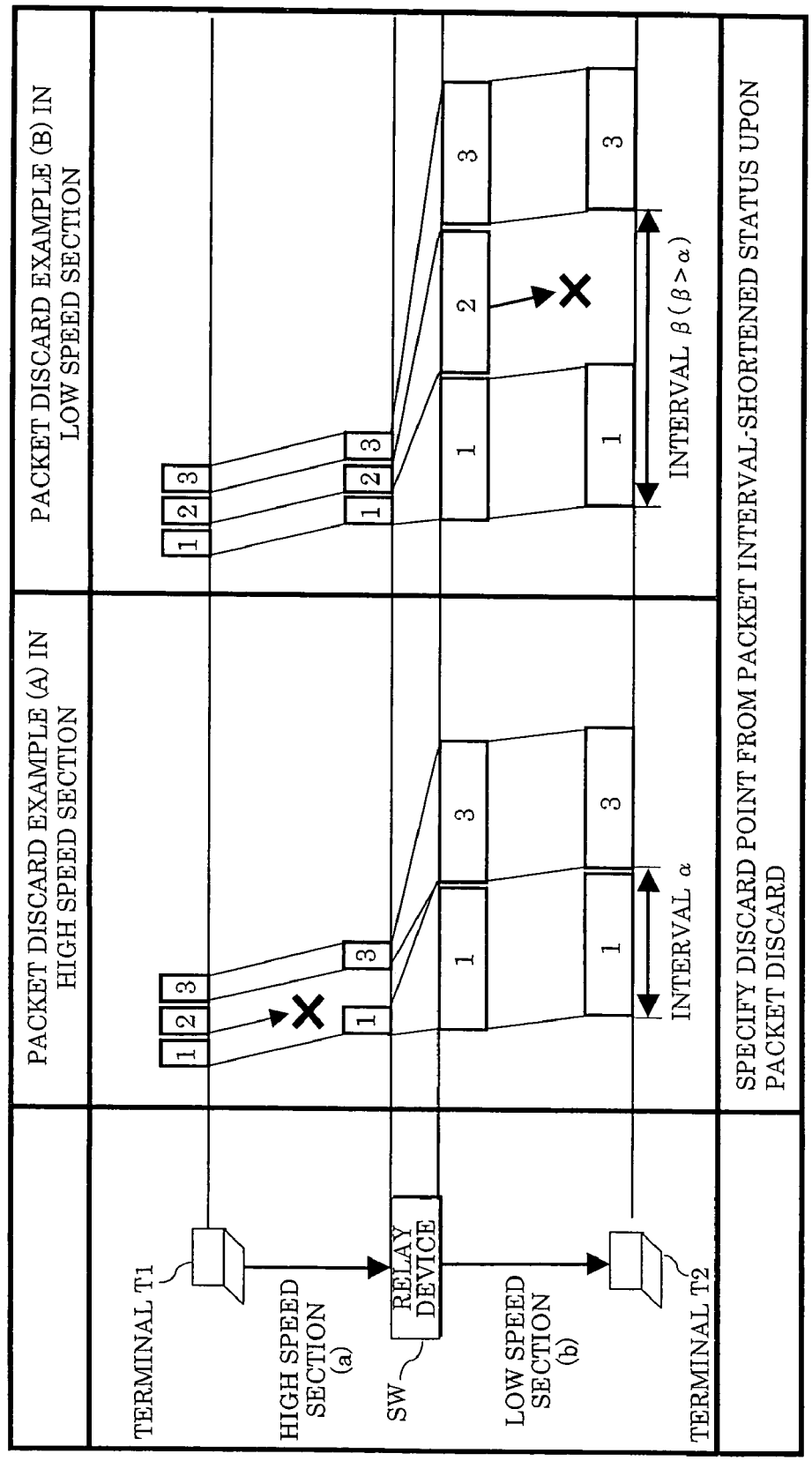
FIG. 1 is a diagram illustrating a principle (1) of the present invention.
Figure 2:
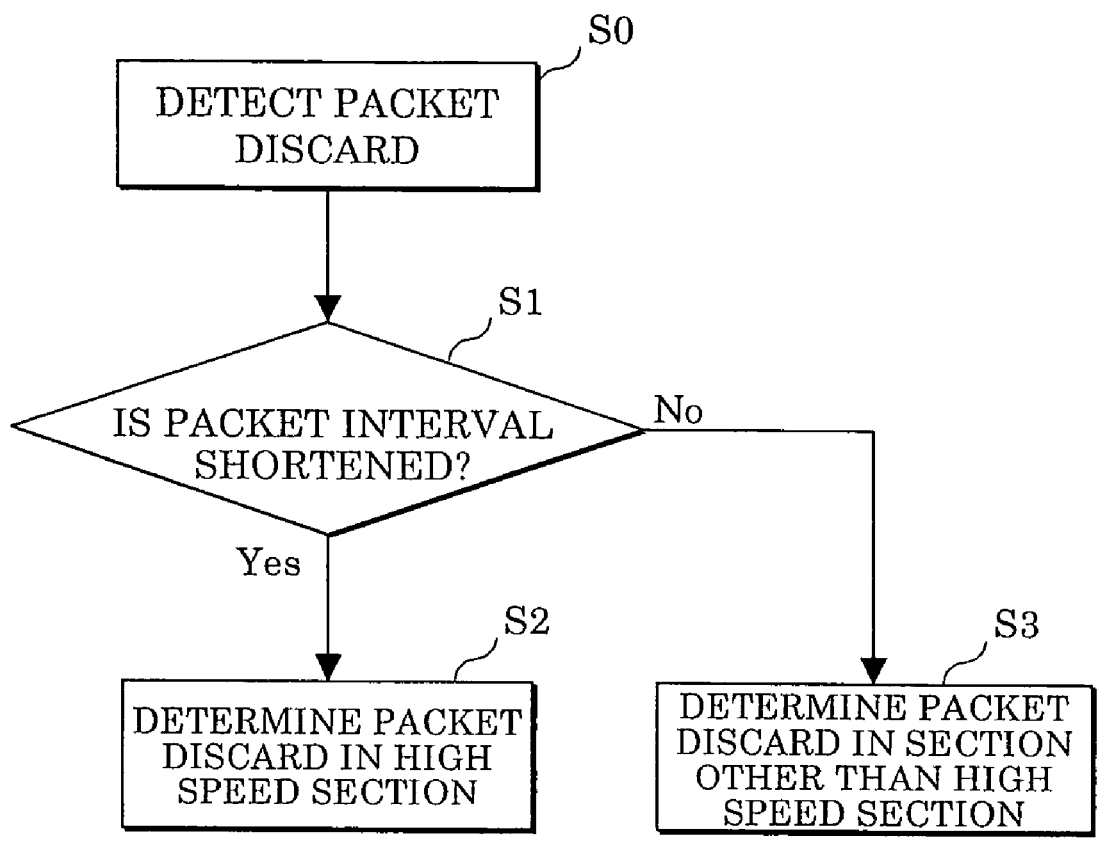
FIG. 2 is a diagram illustrating a principle (2) of the present invention.

This operational embodiment is for illustrating a method for determining the case where the packet interval is shortened ($\alpha$) and the case where the packet interval is unshortened ($\beta$) as shown in FIG. 1. Hereinafter, the procedures (1)-(4) shown in FIGS. 30A-30C will be described referring to the flow chart of FIG. 31.

Figure 31:
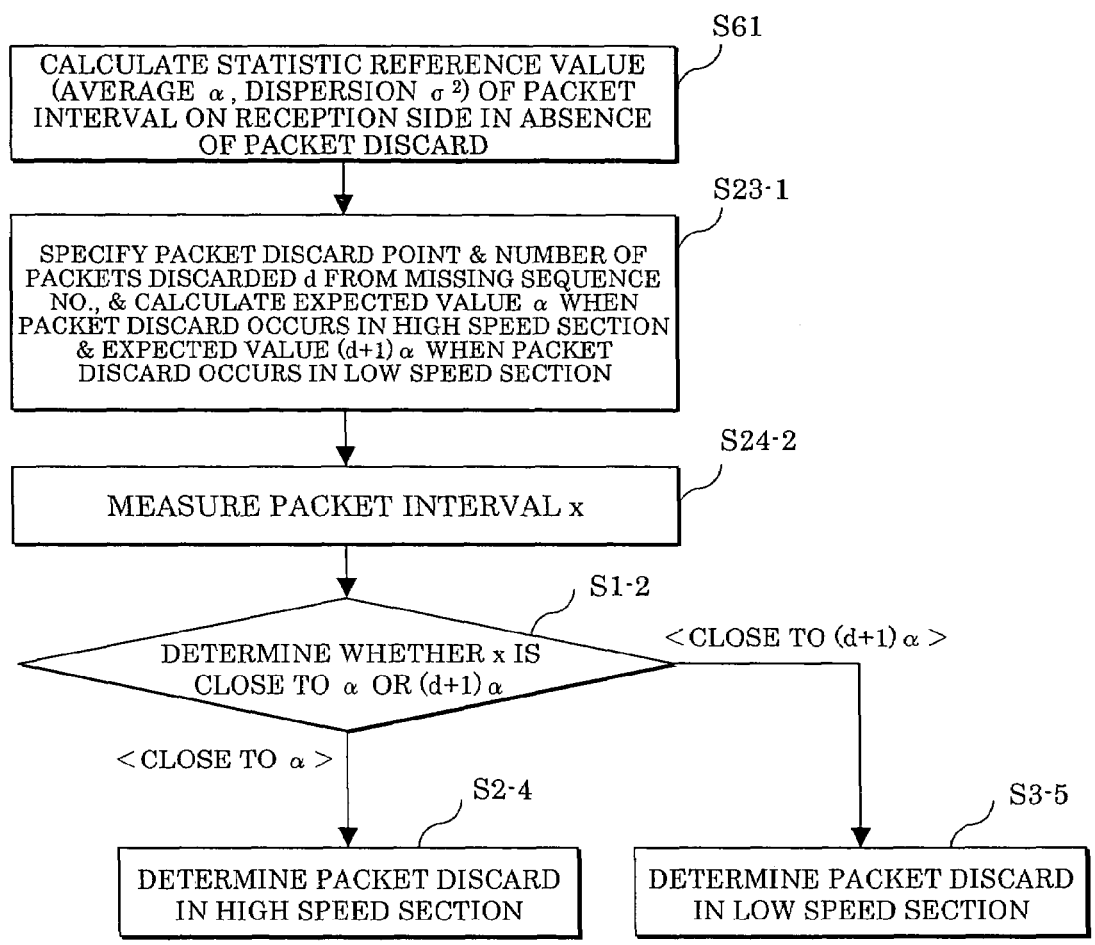
FIG. 31 is a flow chart of an operational embodiment (8) of the present invention.

(1) An average $\alpha$ and dispersion $\sigma^2$ of the packet intervals on the reception side in the case where no packet discard occurs (no missing sequence number) are calculated (FIG. 30A, at step S61 of FIG. 31).

(2) The number of sequential packet discards "d" when the packet discard occurs (there is found a missing sequence number) is specified from the number of missing sequence numbers. An expected value $\alpha$ of the packet interval when the packet discard has occurred in the high speed section and an expected value ((d+1) $\alpha$) of the packet interval when the packet discard has occurred in the low speed section are calculated (FIG. 30A, at step S23-1).

(3) A packet interval "x" is calculated from the number of sequential packet discards (FIG. 30A, at step S24-2).

(4) Whether the packet interval "x" is close to a or (d+1) $\alpha$ is determined.

(5) Instead of the above-mentioned (4), probability distributions (e.g. normal distributions shown in FIG. 30C) D1 and D2 of the packet discards in the high speed section and the low speed section are assumed, a probability Ph under the assumption that the packet discard has occurred in the high speed section and a probability P1 under the assumption that the packet discard has occurred in the low speed section are respectively calculated from the probability distributions D1 and D2, whereby the larger one may be adopted (FIG. 30B).

Figure 32:
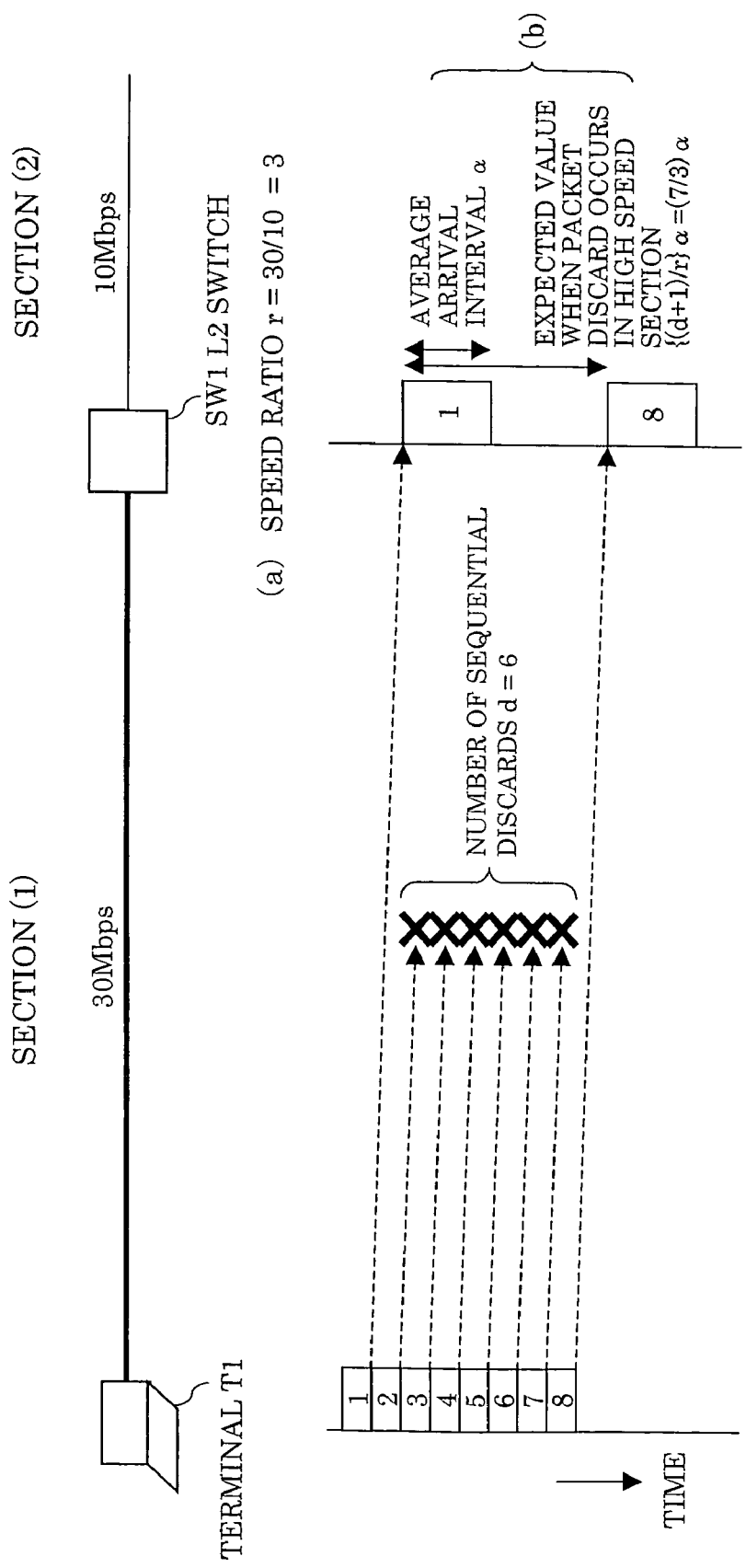
FIG. 32 is a diagram showing an example of calculating a packet interval upon packet discard in a high speed section in consideration of a speed ratio in an operational embodiment (9) of the present invention.

Operational Embodiment (9) (Calculation Method of Packet Intervals upon Packet Discard in the High Speed Section in Consideration of the Speed Ratio: FIGS. 32 and 33)

In this operational embodiment, the packet intervals are calculated corresponding to the case where even if the packet discard occurs in the high speed section when the ratio of the speed change from the high speed to the low speed is small, the packet intervals are not completely shortened in the relay device or the like in which the speed change occurs from the high speed to the low speed, and whether the packet discard has occurred in the high speed section or the low speed section is determined.

FIG. 32 shows a method of calculating the packet intervals when the packet discard occurs in the high speed section in consideration of the speed ratio between the high speed section and the low speed section. The procedures (a) and (b) shown in FIG. 32 will now be described referring to the flow chart of FIG. 33.

(a) A speed ratio "r" between the high speed section and the low speed section (=high speed section speed/low speed section speed) is calculated. In this example, r=3 (at step S71 of FIG. 33).

(b) The average of the packet intervals is made $\alpha$ on the reception side when no packet discard occurs (no missing sequence number) and the number of sequential packet discards is made "d". The expected value of the packet intervals when the packet discard has occurred in the high speed section assumes a larger one of the following cases (at steps S61 and S23-1):

$\alpha$ (where all of the intervals are shortened)

$\{(d+1)/r\}\ \alpha$ (where part of the intervals is shortened)

Namely, Max ($\alpha, \{(d+1)/r\}\ \alpha$) is calculated. Since d=6 in this example, the expected value assumes Max($\alpha,(7/3)\ \alpha$)= (7/3) $\alpha$.

Following steps S24-2, S1-3, S2-4, S3-5 are executed in the same way as FIG. 31. However, at step S1-3, Max($\alpha,\{(d+1)/r\}\ \alpha$) is substituted for $\alpha$ at step S1-2.

We claim:

1. A packet discard point probing method comprising:
   a first step of transmitting sequential packets to a transmission line which has a high speed section and a low speed section;
   a second step of receiving the packets;
   a third step of detecting a packet having been discarded based on sequentiality of the packets received; and
   a fourth step of determining whether or not a packet interval is shortened due to the packet having been discarded and determining, based on the determination, whether or not the packet has been discarded at least in the high speed section.

2. The packet discard point probing method as claimed in claim 1 wherein the first step is executed at a terminal different from a terminal at which the second to the fourth steps are executed, and the third and the fourth steps are executed to determine that a packet has been discarded in the high speed section when the packet interval is shortened and that a packet has been discarded in the low speed section when the packet interval is unshortened.

3. The packet discard point probing method as claimed in claim 1 wherein the first to the fourth steps are executed at a same probing terminal, a probing packet is transmitted from the probing terminal, and the third and the forth steps are executed to a response packet received from an opposing probed terminal, thereby specifying whether or not a packet has been discarded in a high speed section in an up direction based on a sequence number and an arrival interval of the response packet.

4. The packet discard point probing method as claimed in claim 3 wherein the probing packet includes contents for setting an IP time stamp indicating the packet interval at the probed terminal, and the third step observes the sequence number of the response packet and IP time stamp information set by the probed terminal, thereby detecting the packet having been discarded.

5. The packet discard point probing method as claimed in claim 1 wherein the first to the fourth steps are executed at a same probing terminal, a probing packet is transmitted from the probing terminal, the probing packet has a size large enough to cause an IP fragment to a probed terminal, and the third and the fourth steps are executed to observe a sequence number and an arrival interval of a fragment response packet, thereby determining that a packet has been discarded in a high speed section or a low speed section in a down direction.

6. The packet discard point probing method as claimed in claim 1 wherein the first and the second steps are executed by using a packet for TCP data communication between different terminals, and a data receiving terminal observes a sequence number and an arrival interval of a data receiving packet at the third and the fourth steps, thereby specifying whether a packet has been discarded in a high speed section or a low speed section in an up TCP data transfer direction.

7. The packet discard point probing method as claimed in claim 1 wherein the first and the second steps are executed at a same terminal to transmit a packet for TCP data communication from a transmitting terminal, and at the third and the fourth steps a sequence number and an arrival interval of an Ack packet returned from a data reception side are observed by the transmitting terminal, thereby specifying whether or not a packet has been discarded in a high speed section in an up TCP data transfer direction.

8. The packet discard point probing method as claimed in any one of claim 1 wherein the first step limits a number of packets sequentially transmitted at one time to a number of packets which do not overflow a buffer on the transmission line.

9. The packet discard point probing method as claimed in claim 8 wherein the first step is executed to transmit packets at transmission intervals calculated based on a bottleneck bandwidth of the transmission line.

10. The packet discard point probing method as claimed in claim 1 wherein the fourth step includes steps of calculating a statistic reference value of a packet interval on a reception side in an absence of a packet discard, and of determining whether a packet interval upon detecting the packet discard is close to either an expected packet interval-value for the high speed section or an expected packet interval value for the low speed section obtained from the reference value and a number of discarded packets, thereby determining whether the packet discard has occurred in the high speed section or the low speed section of the transmission line.

11. The packet discard point probing method as claimed in claim 10 wherein the fourth step includes a step of calculating a speed ratio between the high speed section and the low speed section, and as expected packet interval value in the high speed section a larger one of expected packet interval values in a case where packet intervals by the reference value are completely shortened and in a case where a part of packet intervals incorporating the speed ratio into the reference value is shortened is used.

12. The packet discard point probing method as claimed in claim 10 wherein a probability based on statistic information of the packet intervals upon detecting the packet having been discarded is substituted for each of the expected values, and a higher one of packet discard probabilities in respective probability distributions under assumption that a packet has been discarded in the high speed section and the low speed section is selected, thereby determining whether the packet has been discarded in the high speed section or the low speed section of the transmission line.

13. A packet discard point probing device comprising:
first means of transmitting sequential packets to a transmission line which has a high speed section and a low speed section;
second means of receiving the packets;
third means of detecting a packet having been discarded based on the sequentiality of the packets received; and
fourth means of determining whether or not a packet interval is shortened due to the packet having been discarded and determining, based on the determination, whether or not the packet has been discarded at least in the high speed section.

14. The packet discard point probing device as claimed in claim 13 wherein the first means is provided to a terminal different from a terminal of the second to the fourth means, and the third and the fourth means determine that a packet has been discarded in the high speed section when the packet interval is shortened and that a packet has been discarded in the low speed section when the packet interval is unshortened.

15. The packet discard point probing device as claimed in claim 13 wherein the first to the fourth means are provided to a same probing terminal, a probing packet is transmitted from the probing terminal, and the third and the forth means specify whether or not a packet has been discarded in a high speed section in an up direction based on a sequence number and an arrival interval of a response packet for the response packet received from an opposing probed terminal.

16. The packet discard point probing device as claimed in claim 13 wherein the probing packet includes contents for setting an IP time stamp indicating the packet interval at the probed terminal, and the third means observes the sequence number of the response packet and IP time stamp information set by the probed terminal, thereby detecting the packet having been discarded.

17. The packet discard point probing device as claimed in claim 13 wherein the first to the fourth means are provided to a same probing terminal, a probing packet is transmitted from the probing terminal, the probing packet has a size large enough to cause an IP fragment to a probed terminal, and the third and the fourth means observe a sequence number and an arrival interval of a fragment response packet, thereby determining that a packet has been discarded in a high speed section or a low speed section in a down direction.

18. The packet discard point probing device as claimed in claim 13 wherein the first and the second means are provided to different terminals and executed by using a packet for TCP data communication between the different terminals, and a data receiving terminal observes a sequence number and an arrival interval of a data receiving packet at the third and the fourth means, thereby specifying whether a packet has been discarded in a high speed section or a low speed section in an up TCP data transfer direction.

19. The packet discard point probing device as claimed in claim 13 wherein the first and the second means are provided to a same terminal to transmit a packet for TCP data communication from a transmitting terminal, and at the third and the fourth means a sequence number and an arrival interval of an Ack packet returned from a data reception side are observed by the transmitting terminal, thereby specifying whether or not a packet has been discarded in a high speed section in an up TCP data transfer direction.

20. The packet discard point probing device as claimed in claim 13 wherein the first means limits a number of packets sequentially transmitted at one time to a number of packets which do not overflow a buffer on the transmission Line.

21. The packet discard point probing device as claimed in claim 20 wherein the first means transmits packets at transmission intervals calculated based on a bottleneck bandwidth of the transmission line.

22. The packet discard point probing device as claimed in claim 13 wherein the fourth means includes means of calculating a statistic reference value of a packet interval on a reception side in an absence of a packer discard, and of determining whether a packet interval upon detecting the packet discard is close to either a an expected packet interval-value for the high speed section or an expected packet interval value for the low speed section obtained from the reference value and a number of discarded packets, thereby determining whether the packet discard has occurred in the high speed section or the low speed section of the transmission line.

23. The packet discard point probing device as claimed, in claim 22 wherein the fourth means includes means of calculating a speed ratio between the high speed section and the low speed section, and as an expected packet interval value in the high speed section a larger one of expected packet interval values in a case where packet intervals by the reference value are completely shortened and in a case where a part of packet intervals incorporating the speed ratio into the reference value is shortened is used.

24. The packet discard point probing device as claimed in claim 22 wherein a probability based on statistic information of the packet intervals upon detecting the packet having been discarded is substituted for each of the expected values, and a higher one of packet discard probabilities in respective probability distributions under assumption that a packet has been discarded in the high speed section and the low speed section is selected, thereby determining whether the packet has been discarded in the high speed section or the low speed section of the transmission line.

* * * * *